US010085193B2

(12) United States Patent
Baghel et al.

(10) Patent No.: US 10,085,193 B2
(45) Date of Patent: Sep. 25, 2018

(54) METHODS FOR 3GPP WLAN INTERWORKING FOR IMPROVED WLAN USAGE THROUGH OFFLOAD

(71) Applicant: INTERDIGITAL PATENT HOLDINGS, INC., Wilmington, DE (US)

(72) Inventors: Sudhir Kumar Baghel, Bridgewater, NJ (US); Mahmoud Watfa, Saint Leonard (CA); Li-Hsiang Sun, Smithtown, NY (US); Guanzhou Wang, Brossard (CA); Ulises Olvera-Hernandez, Montreal (CA); Saad Ahmad, Montreal (CA); Samian Kaur, Plymouth Meeting, PA (US); Pascal M. Adjakple, Great Neck, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 14/782,004

(22) PCT Filed: Apr. 4, 2014

(86) PCT No.: PCT/US2014/033096
§ 371 (c)(1),
(2) Date: Oct. 2, 2015

(87) PCT Pub. No.: WO2014/165832
PCT Pub. Date: Oct. 9, 2014

(65) Prior Publication Data
US 2016/0044567 A1 Feb. 11, 2016

Related U.S. Application Data

(60) Provisional application No. 61/808,492, filed on Apr. 4, 2013.

(51) Int. Cl.
*H04W 36/22* (2009.01)
*H04W 28/08* (2009.01)
(Continued)

(52) U.S. Cl.
CPC .......... *H04W 36/22* (2013.01); *H04W 28/08* (2013.01); *H04W 36/14* (2013.01); *H04W 48/06* (2013.01); *H04W 84/12* (2013.01); *H04W 88/06* (2013.01)

(58) Field of Classification Search
CPC ..... H04W 36/22; H04W 48/06; H04W 36/14; H04W 28/08; H04W 84/12; H04W 88/06
See application file for complete search history.

(56) References Cited

U.S. PATENT DOCUMENTS

2007/0173283 A1* 7/2007 Livet ............... H04W 88/06
455/552.1
2011/0222523 A1* 9/2011 Fu ..................... H04W 36/22
370/338
(Continued)

FOREIGN PATENT DOCUMENTS

CN 102892143 A 1/2013
CN 102960018 A 3/2013
(Continued)

OTHER PUBLICATIONS

3rd Generation Partnership Project (3GPP), RP-111094, "Discussions on Carrier Aggregation Across LTE and WIFI", 3GPP TSG-RAN meeting #53, Fukuoka, Japan, Sep. 13-16, 2011, 4 pages.
(Continued)

Primary Examiner — Tejis Daya
(74) Attorney, Agent, or Firm — Condo Roccia Koptiw LLP

(57) ABSTRACT

Systems, methods, and instrumentalities are disclosed for bearer management in a wireless network using virtual
(Continued)

bearers. Systems, methods, and instrumentalities are also disclosed for managing conflicts between an eNB decision to offload a wireless transmit/receive unit (WTRU) to a WLAN and an ANDSF policy. Systems, methods, and instrumentalities are also disclosed for minimization of drive tests (MDT) for WLAN or during an offload to WLAN. Systems, methods, and instrumentalities are also disclosed for signaling capabilities of a WTRU.

19 Claims, 13 Drawing Sheets

(51) Int. Cl.
*H04W 36/14* (2009.01)
*H04W 48/06* (2009.01)
*H04W 88/06* (2009.01)
*H04W 84/12* (2009.01)

(56) References Cited

U.S. PATENT DOCUMENTS

| | | | |
|---|---|---|---|
| 2011/0317571 A1* | 12/2011 | Kokkinen | H04W 24/00 370/252 |
| 2012/0023189 A1* | 1/2012 | Giaretta | H04W 48/18 709/217 |
| 2012/0196644 A1* | 8/2012 | Scherzer | H04W 48/18 455/524 |
| 2012/0207033 A1* | 8/2012 | Hakola | H04W 16/14 370/252 |
| 2013/0155876 A1 | 6/2013 | Potra et al. | |
| 2013/0258900 A1 | 10/2013 | Kokkinen et al. | |
| 2014/0003239 A1* | 1/2014 | Etemad | H04W 28/08 370/235 |
| 2014/0050086 A1* | 2/2014 | Himayat | H04N 21/2365 370/230 |
| 2014/0133298 A1* | 5/2014 | Han | H04W 28/0289 370/230 |
| 2014/0204904 A1* | 7/2014 | Xiang | H04W 36/0066 370/331 |
| 2014/0204909 A1 | 7/2014 | Cheng et al. | |
| 2014/0211626 A1 | 7/2014 | Liu | |
| 2016/0050605 A1* | 2/2016 | Kim | H04W 28/08 370/331 |

FOREIGN PATENT DOCUMENTS

| | | | | |
|---|---|---|---|---|
| JP | 2008-541670 A | 11/2008 | | |
| JP | 2013502850 A | 1/2013 | | |
| JP | WO 2013042330 A1 * | 3/2013 | ............ | H04W 8/082 |
| JP | 2014-526808 A | 10/2014 | | |
| WO | WO 2006-124950 A2 | 11/2006 | | |
| WO | WO 2011/022570 A1 | 8/2010 | | |
| WO | WO 2012/038911 A1 | 3/2012 | | |
| WO | WO 2013/010500 A1 | 1/2013 | | |
| WO | WO 2013010500 A1 * | 1/2013 | ............ | H04W 28/08 |
| WO | WO 2013/040978 A1 | 3/2013 | | |
| WO | WO 2013/042330 A1 | 3/2013 | | |
| WO | WO2013/096146 A1 | 6/2013 | | |

OTHER PUBLICATIONS

3rd Generation Partnership Project (3GPP), RP-111104, "New Study Item Proposal for Radio Level Dynamic Flow Switching between 3GPP-LTE and WLAN", Intel Corporation, Vodafone, 3GPP TSG RAN#53, Fukuoka, Japan, Sep. 13-16, 2011, 5 pages.
Qualcomm, "A 3G/LTE Wi-Fi Offload Framework: Connectivity Engine (CnE) to Manage Inter-System Radio Connections and Applications", Qualcomm Incorporated, Jun. 2011, 15 pages.
Article, SKT, "3G and Wi-Fi Automatic Connection Technology Development", May 2, 2011.
$3^{rd}$ Generation Partnership Project (3GPP), TS 36.212 V11.2.0, "$3^{rd}$ Generation Partnership Project; Technical Specification Group Radio Access Network; Evolved Universal Terrestrial Radio Access (E-UTRA); Multiplexing and channel coding (Release 11)", Feb. 2, 2013, 82 pages.
$3^{rd}$ Generation Partnership Project (3GPP), TS 36.213 V11.2.0, $3^{rd}$ Generation Partnership Project; Technical Specification Group Radio Access Network; Evolved Universal Terrestrial Radio Access (E-UTRA); Physical layer procedures (Release 11), Feb. 2013, 173 pages.
$3^{rd}$ Generation Partnership Project (3GPP), TS 36.321 V11.2.0, "$3^{rd}$ Generation Partnership Project; Technical Specification Group Radio Access Network; Evolved Universal Terrestrial Radio Access (E-UTRA); Medium Access Control (MAC) protocol specification (Release 11)", Mar. 2013, 56 pages.
$3^{rd}$ Generation Partnership Project (3GPP), TS 36.331 V11.3.0, "$3^{rd}$ Generation Partnership Project; Technical Specification Group Radio Access Network; Evolved Universal Terrestrial Radio Access (E-UTRA); Radio Resource Control (RRC); Protocol specification (Release 11)", Mar. 2013, 344 pages.
English Translation of relevant pages of Article, SKT, "3G and Wi-Fi Automatic Connection Technology Development", May 2, 2011, 2 pages.

* cited by examiner

METHODS FOR 3GPP WLAN INTERWORKING FOR IMPROVED WLAN USAGE THROUGH OFFLOAD

CROSS-REFERENCE TO RELATED APPLICATION

This application is the National Stage entry under 35 U.S.C. § 371 of Patent Cooperation Treaty Application PCT/US2014/033096, filed Apr. 3, 2014, which claims the benefit of U.S. Provisional Patent Application No. 61/808,492, filed Apr. 4, 2013, the entire contents of which being hereby incorporated by reference as if fully set forth herein, for all purposes.

BACKGROUND

Increasing demand for higher data rates has contributed to the development of faster and efficient radio technologies. Cellular networks, such as LTE, and WLAN have seen wide acceptance from operators and end users. There is growing interest in the operator community to offload as much as data to WLAN networks whenever they are available so that cellular network load can be reduced. At the same time, operators can serve more and more customers. The Third Generation Partnership Project (3GPP) has developed several technologies to allow interworking between 3GPP networks (e.g., LTE and 3G) with WiFi. These technologies may be primarily core network-based for WiFi offload.

SUMMARY

Systems, methods, and instrumentalities are disclosed for bearer management in a wireless network using virtual bearers. Systems, methods, and instrumentalities are also disclosed for managing conflicts between an eNB decision to offload a wireless transmit/receive unit (WTRU) to a WLAN and an ANDSF policy. Systems, methods, and instrumentalities are also disclosed for minimization of drive tests (MDT) for WLAN or during an offload to WLAN. Systems, methods, and instrumentalities are also disclosed for signaling capabilities of a WTRU.

A wireless transmit/receive unit (WTRU) may determine whether to offload traffic to or from a WLAN network by determining whether to steer traffic to or from the WLAN network according to at least one of higher layer policies and radio access stratum rules. A configured WLAN offload condition may be evaluated. If the configured WLAN offload condition has been met, traffic may be steered to or from the WLAN network.

A method is used for determining, at a wireless transmit/receive unit (WTRU), whether to offload traffic to or from a WLAN network. The method may include determining, in the WTRU, whether to steer traffic to or from the WLAN network according to at least one of higher layer policies and radio access stratum rules, evaluating a configured WLAN offload condition, and if the configured WLAN offload condition has been met, steering traffic to or from the WLAN network. The method may also include receiving, in the WTRU, a configuration threshold from a radio access network and evaluating the configuration threshold at least by evaluating a condition of traffic steering to or from the WLAN network. The configuration threshold may include an implicit indication to the WTRU of a radio access network preference for the WTRU to steer traffic to or from the WLAN network. The method may also include evaluating the condition of traffic steering to or from the WLAN network based on a higher layer policy. The method may also include evaluating the condition of traffic steering to or from the WLAN network based on a radio access stratum rule.

The method may also include, in response to evaluating the configuration threshold, forwarding at least one of the configuration threshold or an offload desired indication from a WTRU access stratum to a WTRU upper layer. The WTRU upper layer may include an ANDSF policy engine. The method may also include, in response to forwarding the at least one of the configuration threshold or an offload desired indication from the WTRU access stratum to the WTRU upper layer, causing an ANDSF policy to be bypassed. The method may also include, in response to at least one of evaluating the configured WLAN offload condition or forwarding the offload desired indication from the WTRU access stratum to the WTRU upper layer, bypassing an ANDSF policy engine. The method may also include, in response to forwarding the at least one of the configuration threshold or an offload desired indication from the WTRU access stratum to the WTRU upper layer, causing an ANDSF policy to determine a traffic class that is eligible for traffic steering to or from the WLAN network. The method may also include, in response to forwarding the at least one of the configuration threshold or an offload desired indication from the WTRU access stratum to the WTRU upper layer, causing an ANDSF policy to determine whether traffic steering to or from the WLAN network is prohibited.

The method may also include, in response to at least one of evaluating the configured WLAN offload condition or forwarding the offload desired indication from the WTRU access stratum to the WTRU upper layer, causing an ANDSF policy engine to determine whether an access point is suitable for offloading. The method may also include receiving, in the WTRU, a measurement scaling parameter. The method may also include adjusting a frequency of performing a WLAN measurement as a function of the measurement scaling parameter. The measurement scaling parameter may include at least one of an S-measure value, a hysteresis value, an offload offset value, or an offload threshold value.

A method may be used for signaling a capability of a wireless transmit/receive unit (WTRU) in a wireless network. The method may include indicating a capability of the WTRU of supporting WLAN offloading to the wireless network and signaling the wireless network from the WTRU when a WLAN component of the WTRU is activated.

A WTRU may include a WLAN component, a processor, and a memory in communication with the processor and storing instructions that, when executed by the processor, causes the WTRU to perform the method herein.

BRIEF DESCRIPTION OF THE DRAWINGS

A more detailed understanding may be had from the following description, given by way of example in conjunction with the accompanying drawings wherein.

DETAILED DESCRIPTION

A detailed description of illustrative embodiments will now be described with reference to the various Figures. Although this description provides a detailed example of possible implementations, it should be noted that the details are intended to be exemplary and in no way limit the scope of the application.

Figure 1A:
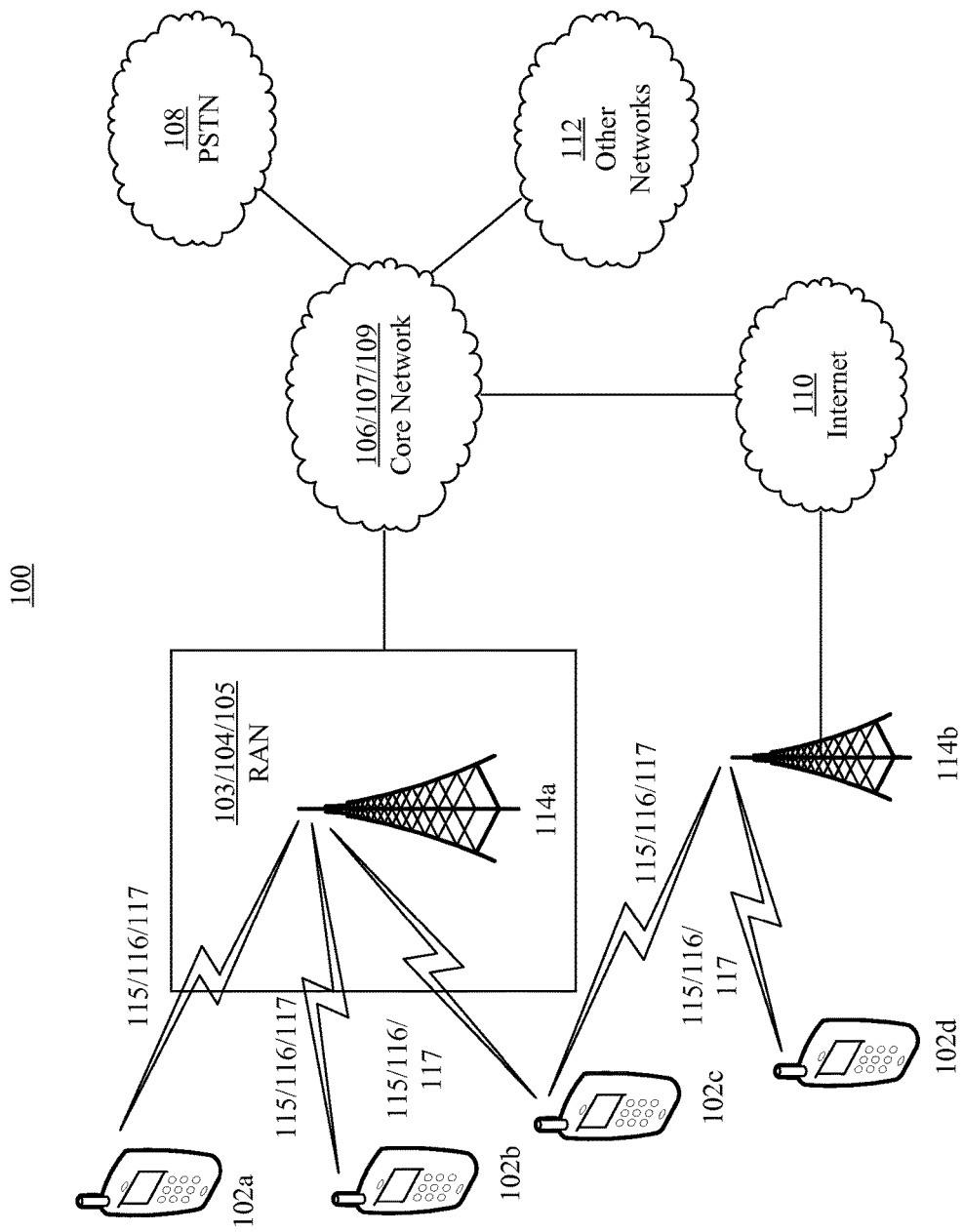
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, and/or 102d (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106/107/109, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 115/116/117 using Long Term Evolution (LTE) and/or LTE-Advanced (LTE-A).

In other embodiments, the base station 114a and the WTRUs 102a, 102b, 102c may implement radio technologies such as IEEE 802.16 (e.g., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or Voice over Internet Protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication. Although not shown in FIG. 1A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the Internet protocol (IP) in the TCP/IP Internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities, e.g., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
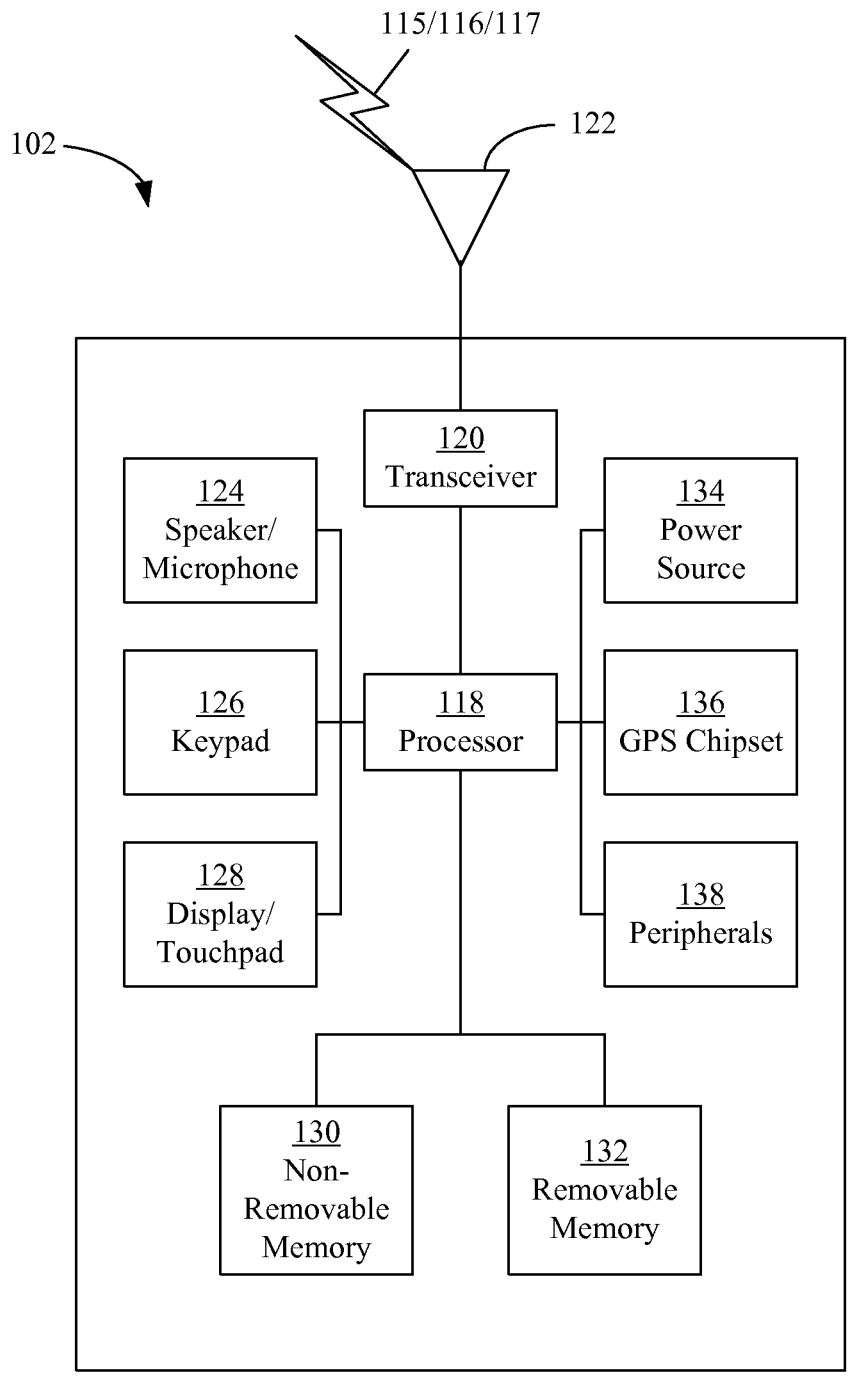
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip. A processor, such as the processor 118, may include integrated memory (e.g., WTRU 102 may include a chipset that includes a processor and associated memory). Memory may refer to memory that is integrated with a processor (e.g., processor 118) or memory that is otherwise associated with a device (e.g., WTRU 102). The memory may be non-transitory. The memory may include (e.g., store) instructions that may be executed by the processor (e.g., software and/or firmware instructions). For example, the memory may include instructions that when executed may cause the processor to implement one or more of the implementations described herein.

The transmit/receive element 122 may be configured to transmit signals to, or receive signals from, a base station (e.g., the base station 114a) over the air interface 115/116/117. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130, the removable memory 132, and/or memory integrated with the processor 118. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
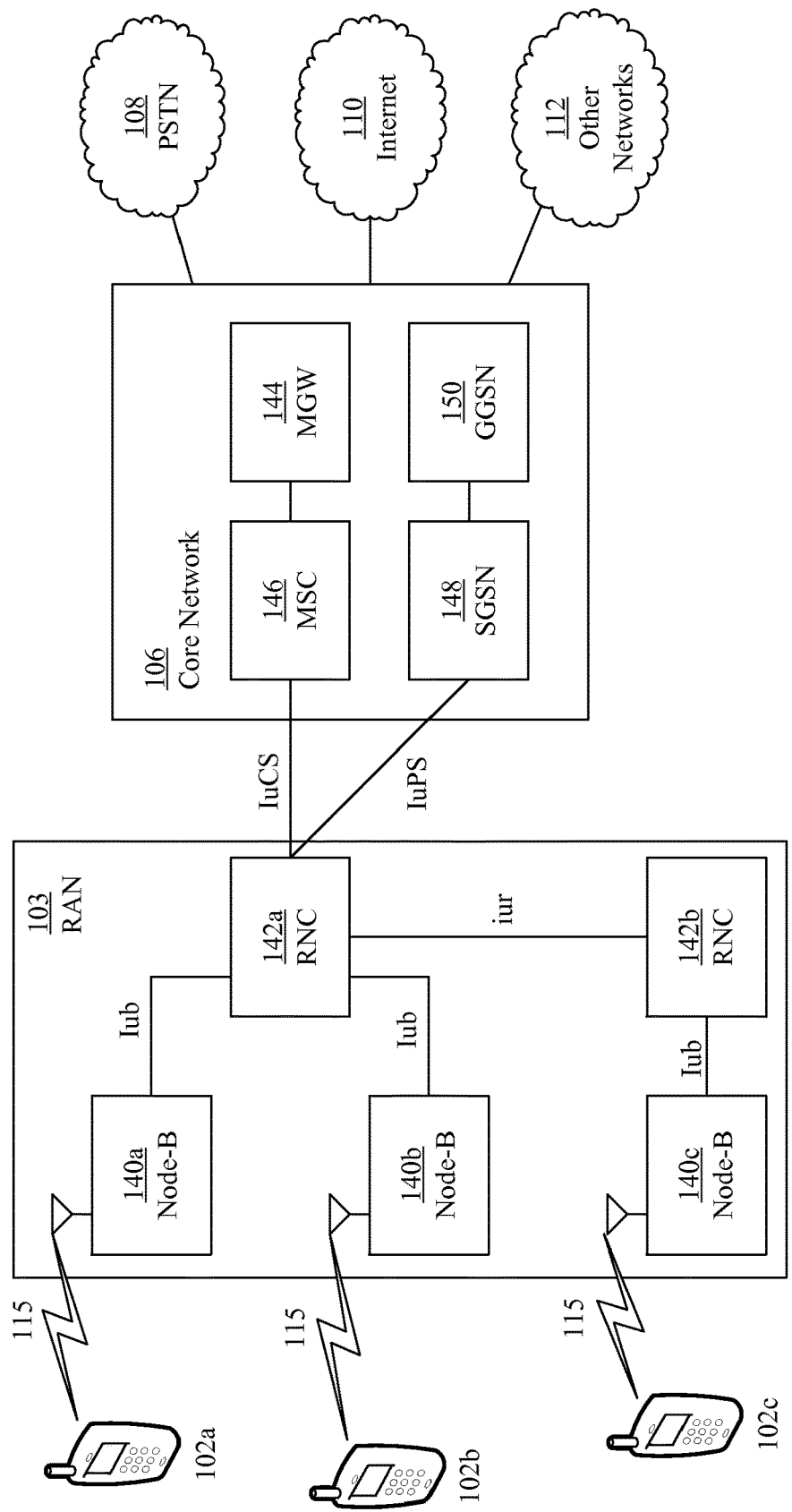
FIG. 1C is a system diagram of an example radio access network and an example core network that may be used within the communications system illustrated in FIG. 1A.

FIG. 1C is a system diagram of the RAN 103 and the core network 106 according to an embodiment. As noted above, the RAN 103 may employ a UTRA radio technology to communicate with the WTRUs 102a, 102b, 102c over the air interface 115. The RAN 103 may also be in communication with the core network 106. As shown in FIG. 1C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 1D:
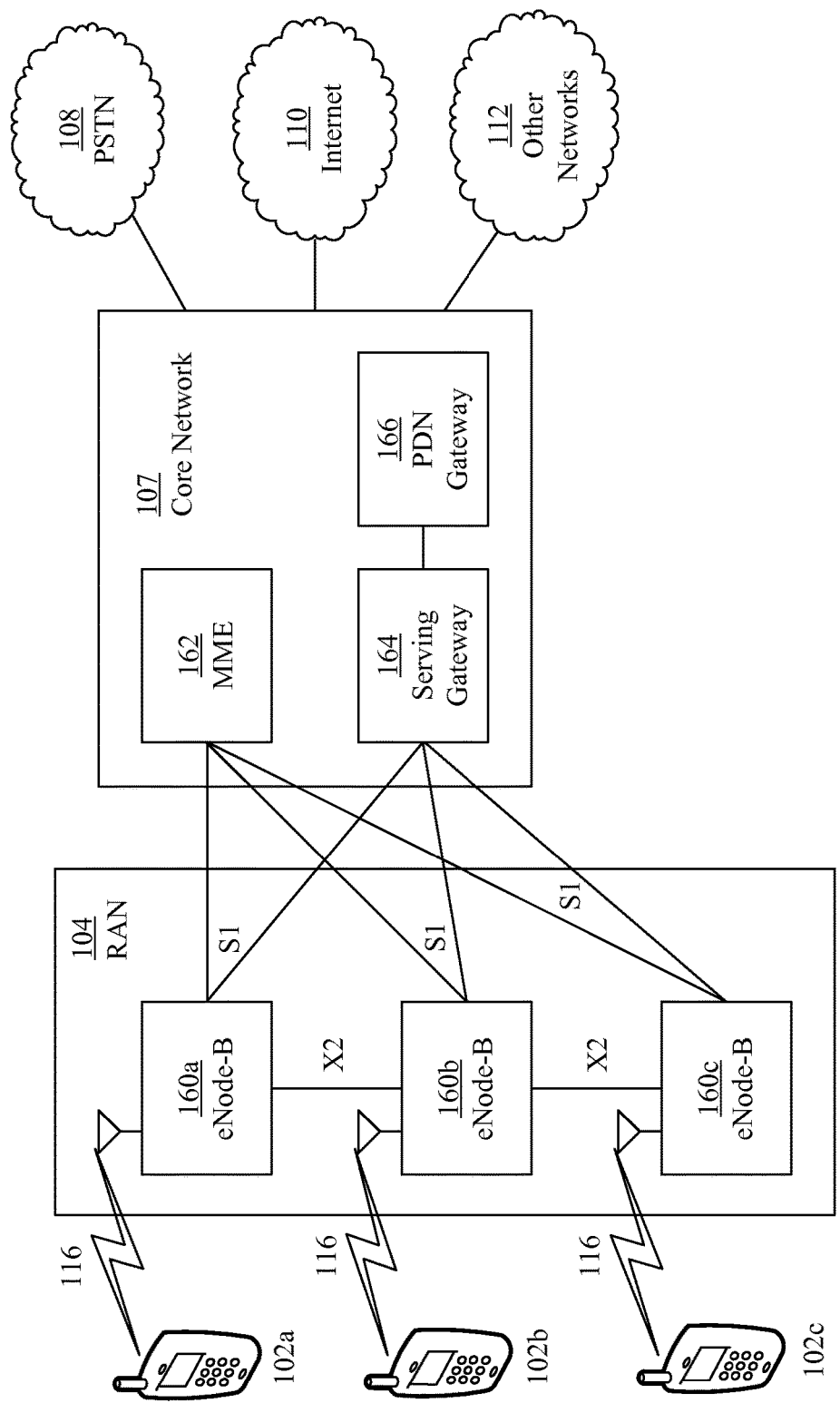
FIG. 1D is a system diagram of an another example radio access network and another example core network that may be used within the communications system illustrated in FIG. 1A.

FIG. 1D is a system diagram of the RAN 104 and the core network 107 according to an embodiment. As noted above, the RAN 104 may employ an E-UTRA radio technology to communicate with the WTRUs 102a, 102b, 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, 160c may be associated with a particular cell (not shown) and may be configured to handle radio resource management decisions, handover decisions, scheduling of users in the uplink and/or downlink, and the like. As shown in FIG. 1D, the eNode-Bs 160a, 160b, 160c may communicate with one another over an X2 interface.

The core network 107 shown in FIG. 1D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 1E:
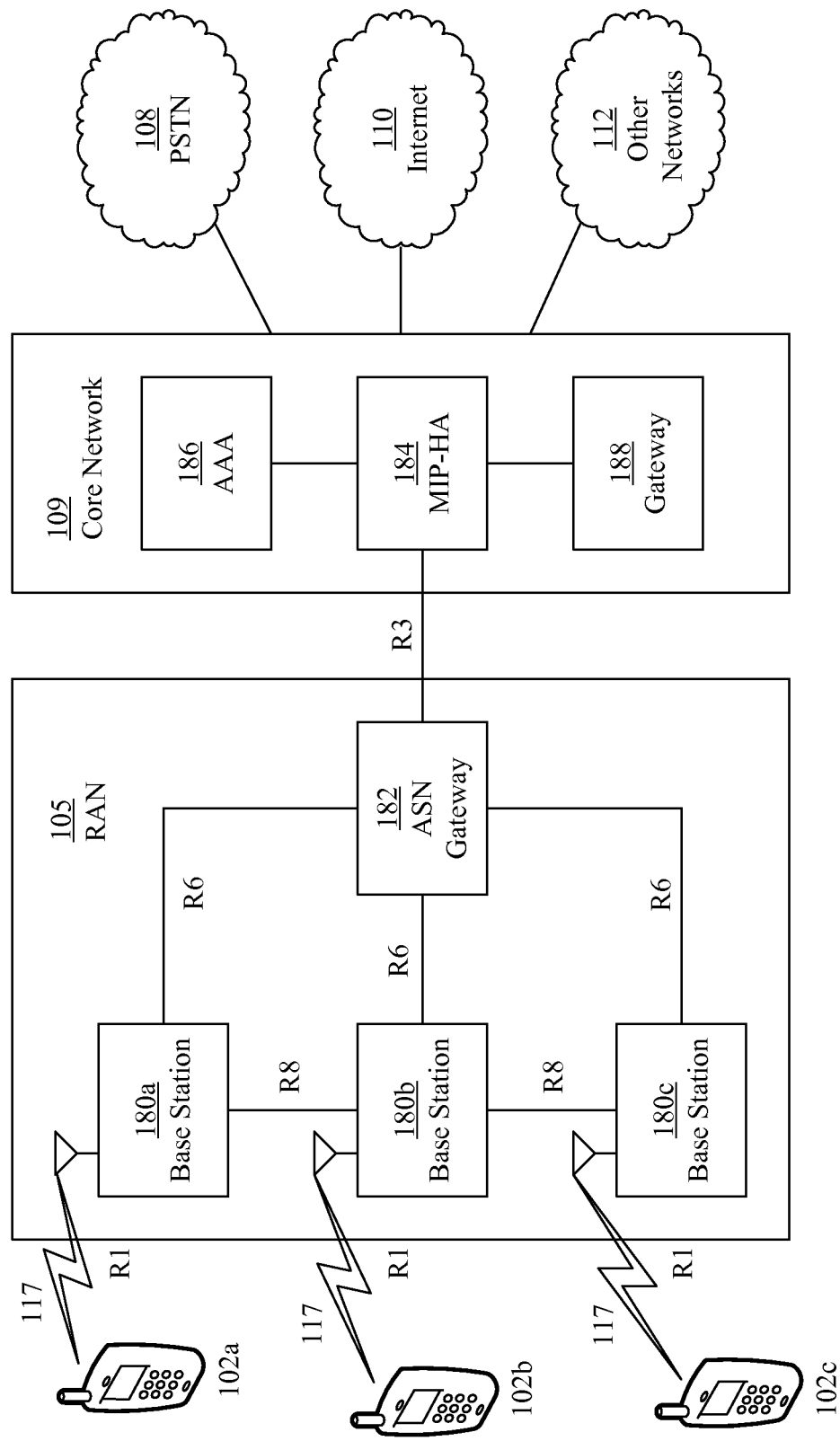
FIG. 1E is a system diagram of an another example radio access network and another example core network that may be used within the communications system illustrated in FIG. 1A.

FIG. 1E is a system diagram of the RAN 105 and the core network 109 according to an embodiment. The RAN 105 may be an access service network (ASN) that employs IEEE 802.16 radio technology to communicate with the WTRUs 102a, 102b, 102c over the air interface 117. As will be further discussed below, the communication links between the different functional entities of the WTRUs 102a, 102b, 102c, the RAN 105, and the core network 109 may be defined as reference points.

As shown in FIG. 1E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell (not shown) in the RAN 105 and may each include one or more transceivers for communicating with the WTRUs 102a, 102b, 102c over the air interface 117. In one embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 1E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 1E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102*b*, 102*c* between the RAN 105 and the other ASNs. The communication link between the core network 109 and the other core networks may be defined as an R5 reference, which may include protocols for facilitating interworking between home core networks and visited core networks.

Generally, 3GPP and WLAN interworking can be categorized into two broadly defined categories. Some methods for WiFi offloading may be core network based and may involve a 3GPP core network and WiFi offloading. Other methods for WiFi offloading may be radio access network (RAN) based and may involve a 3GPP RAN and WiFi offloading.

Access to WLAN networks may be used as a means to perform interworking between WLAN access networks to potentially offload user traffic. For example, a WLAN wireless transmit/receive unit (WTRU) may achieve Internet connectivity and may access 3GPP packet switched (PS) services using Authentication and Authorization via a 3GPP system. A tunnel may be established between the WLAN WTRU and the Packet Data Gateway (PDG) in the 3GPP core network (CN). A WLAN WTRU may receive IP-related configuration parameters from a 3GPP CN node. These parameters may include, for example, remote IP address, DHCP server, and DNS server for the Home Public Land Mobile Network (HPLMN). The WLAN WTRU may have a local IP address, e.g., a WLAN access network (AN) identity. The WLAN WTRU may have both a local IP address, e.g., an outer IP address of the tunnel, and a remote IP address, e.g., an inner address of the tunnel. These IP addresses may be assigned by the WLAN AN or by the PLMN within the WLAN AN IP address space.

A reference architecture may be used for integrating a WLAN as an untrusted access to a 3GPP Evolved Packet Core (EPC). A WLAN can be connected to an evolved Packet Data Gateway (ePDG) and may support PMIPv6 and GTP mobility. An Access Network Discovery and Selection Function (ANDSF) may be used to provide policies to a WTRU for network selection, discovery, and access. A WTRU may simultaneously connect to 3GPP access and WLAN and may exchange different IP flows belonging to the same PDN connection through different accesses. This may enable seamless IP flow mobility, with IP flows belonging to the same or different applications being moved seamlessly between a 3GPP access and a WLAN. IP mobility may be performed between a 3GPP access and a WLAN access based on DSMIPv6. In addition, a WTRU-centric connectivity engine may be implemented and may incorporate enhancements to ANDSF, e.g., Data Identification in Access Network (DIDA).

Interworking may also be supported between WLAN AN and 3GPP accesses, which may include solutions that may allow a tighter integration between WLAN AN and 3GPP accesses and that may avoid a need for a duplicate 3GPP CN functionality. This integration at the radio level may promote efficient discovery of WLAN AP and may promote better utilization of WLAN AP, as well as enhance the quality of experience.

RAN-based methods for WiFi offloading may involve solutions that may enable enhanced operator control for WLAN interworking and that may enable WLAN to be included in the operator's cellular Radio Resource Management (RRM). Such methods may also involve enhancements to access network mobility and selection that may take into account information such as radio link quality per WTRU, backhaul quality, load, etc., for cellular and/or WLAN accesses.

Some methods for mobility control for WiFi offloading may involve methods for discovery of a suitable WiFi AP. These methods may be WTRU autonomous or 3GPP network-controlled. The network may provide assistance information for the discovery procedure. The WTRU may report information on the APs that are discovered.

Some methods for mobility control for WiFi offloading may involve methods to perform security, such as, for example, preauthorization for WiFi access. This may be performed using the 3GPP connection, for example, through a user plane bearer or control plane signaling.

Some methods for mobility control for WiFi offloading may involve methods to setup, control, and release the WiFi connection, which may include mobility in the WiFi AN and handover between WiFi APs under the management of the 3GPP network.

Some methods for mobility control for WiFi offloading may involve methods for configuring and reporting measurements for WiFi.

Some methods for mobility control for WiFi offloading may involve methods to coordinate the WiFi mobility control with 3GPP mobility-related procedures, as well as methods to coordinate the WiFi mobility control with core network (CN) elements for WiFi offloading.

Figure 2:
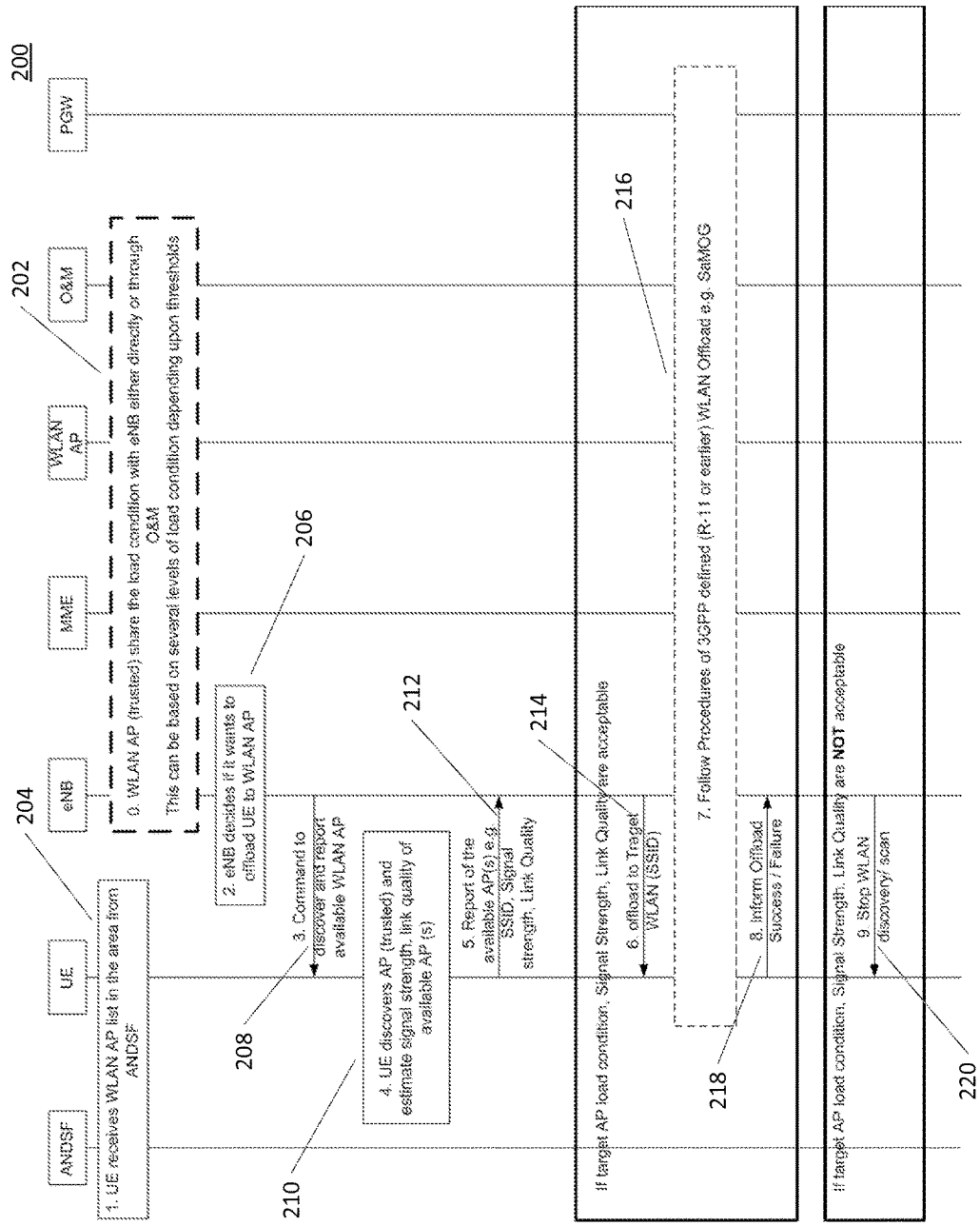
FIG. 2 illustrates an example process flow for RAN level 3GPP and WLAN interworking.

FIG. 2 illustrates an example process flow 200 for RAN level 3GPP and WLAN interworking. At 202, the WLAN AP may share the load condition with the eNB directly or through operation and maintenance (O&M). Different thresholds may be used to indicate different levels of load condition. The eNB and/or the MME may determine the load condition in different APs.

At 204, the WTRU may receive a WLAN AP list in the area from ANDSF. This may be performed independently by the WTRU. This may instead or also be performed by the WTRU when the eNB may send a command to the WTRU to discover WLAN. Receiving the WLAN AP list in response to a command from the eNB may introduce some extra delay.

At 206, the eNB may determine to offload a particular WTRU to WLAN, e.g., depending on its load condition and/or based on RRM. This determination may be based on, for example, traffic pattern, WTRU mobility, available radio resources, traffic not requiring very stringent QoS, particular service, traffic related to a particular application, etc.

At 208, the eNB may send a command to the WTRU to begin WLAN discovery or scan and to report the signal condition of the trusted WLAN APs. WLAN measurement may be configured as a measurement object. A measurement can be started based on an eNB command and/or based on a command to start the WLAN discovery and measurement and report.

At 210, the WTRU may discover a trusted WLAN AP, for example, by using the information from ANDSF and may estimate the signal strength and link quality of available APs. At 212, the WTRU may report the Signal condition (e.g., Signal strength and/or Link Quality), SSID (and/or MAC address, BSSID), and/or the WLAN channel number. The WLAN channel number may be useful, for example, from an in-device coexistence point of view.

At 214, the eNB may consider the information it has received. This information may include, for example, information from the WTRU such as signal strength and/or link quality, information about AP load condition, eNB available radio resources, WTRU traffic pattern, QoS requirement, etc. If the eNB decides to offload the WTRU to WLAN, the eNB may send a command to the WTRU indicating to offload to a particular AP that may be identified, for example, by a SSID and/or a MAC address. If the eNB decides not to offload the WTRU to WLAN, the process flow 200 may proceed to 220, and the WLAN discovery or scan may stop.

At 216, the WTRU may follow a WLAN offload procedure, for example, as disclosed in LTE R10/11 to initiate authentication by sending message to PGW through AP and getting the same IP address. The PGW may forward traffic trough AP for the WTRU. At 218, the WTRU may inform the eNB of the success or failure of the offload to the WLAN. At 220, the eNB may send a command to the WTRU to stop the WLAN discovery or scan process so that the WTRU battery can be saved. This process may be stopped at any time when offloading is no longer required. The eNB may also use this command to cause the WTRU to stop communication in WLAN and come back to 3GPP.

Some CN-based methods may not provide a RAN-initiated mechanism to selectively offload an EPS bearer to WLAN. Further, the user QoE should be maintained when the WTRU is offloaded to WLAN. In some CN-based methods, when the WTRU is offloaded to WLAN, there may be no guarantee and/or monitoring of QoE. When QoS parameters are provided for a particular bearer and if that bearer is offloaded to WLAN, the QoS may be monitored and appropriate action may be taken based on whether QoS is satisfied and/or whether there is a need for bearer modification. Some CN-based offloading mechanisms may assume a WTRU-initiated procedure with a static policy, which may not take into account the dynamic traffic conditions of either the LTE network or the WLAN network. The offloaded traffic may no longer considered EPS bearer(s); thus, the MME and eNBs may no longer be aware of its existence. On the WLAN side, there may be no similar mechanism for bearer management. The network node responsible for cellular radio resource management may not have enough information to effectively manage the offloaded traffic.

There may be a conflict between an eNB's decision to offload a WTRU to WLAN and ANDSF policy. Initiating the offloading of a WTRU to WLAN may begin with scanning to find an available WLAN AP. This may be initiated by the WTRU or by the network. If the network initiates the process, if the eNB takes the decision of starting the offloading procedure, then as per ANDSF policy there may be no traffic/service, etc., to offload to WLAN. This may cause conflict between the eNB's decision to offload the WTRU to WLAN and ANDSF or HS2.0 policy.

As more WLAN APs are deployed by network operators and efficient methods of offload to WLAN are evolving, it may become desirable for operators to monitor WLAN coverage, QoE, throughput, etc. at the time of deployment and/or from time to time. To reduce operational expenses, it may be beneficial to have minimization of drive tests (MDT) for WLAN as well. In addition, even if MDT is used for a 3GPP network, if, during that time, a WTRU is offloaded to WLAN it may be recorded for the accuracy of trace and correct subsequent analysis.

Some WTRUs may lack the capability to support WLAN offload. Accordingly, it may be desirable to signal this capability or the lack of this capability from the WTRU. However, the WiFi component in a WTRU may not be turned on all the time. Further, while some WTRUs can turn on their WiFi components autonomously when commanded by the eNB to do so, some WTRU implementations or user preferences may restrict turning the WiFi component in the WTRU on when the eNB sends a command to the WTRU to turn the WiFi component on and begin scanning for an available WLAN.

When the WTRU is in a connected mode and is moving or is being handed over from 3GPP RAT to WLAN, the RAN operator may generate a charging or accounting record that describes the usage of WLAN system. This charging record may be sent to the charging system and may describe the start and the end of the service provided to its WTRU. A WLAN/RAN interworking scenario may address the generation and use of a charging record. Furthermore, some types of handovers, e.g., handovers between different WLAN APs, may or may not generate a charging event. Accordingly, the network may distinguish events caused by movement of the WTRU to and from the WLAN system, which involve the generation of accounting messages, from mobility events that do not involve the generation of accounting reports.

In order to reduce or minimize degradation of quality of experience (QoE) when a WTRU is offloaded to WLAN, QoS may be met even in the WLAN. A virtual bearer may be used to monitor 3GPP network-provided QoS parameters when data is flowing through WLAN. When a bearer is offloaded from LTE to WLAN and an S2a interface is used for data flow, the original bearer in LTE may be converted to a virtual bearer. The nodes in a virtual bearer may maintain bearer context with virtual bearer flags. Nodes may release the resources that they reserved for the original bearer. The WTRU and/or the PGW may monitor whether or not the QoS for the bearer is now met in the corresponding S2a interface. The signaling of the virtual bearer may also enable selective offloading of an EPS bearer to WLAN via an eNB command. The eNB and MME may be aware of what has been offloaded to WLAN because they may be in the path of virtual EPS session management signaling. This may provide the network nodes responsible for operator's cellular Radio Resource Management the ability to track and move the offloaded IP flows. When the WTRU is idle, the current mechanism may involve monitoring both access networks for LTE and offloaded traffic. Although the WTRU may move the WLAN IP flow back to LTE to avoid monitoring both networks during an idle mode, the procedure may involve the WTRU reconnecting to LTE after the eNB releases the RRC connection. This may not be desirable during congestion. The virtual bearer mechanism may provide a single access network, e.g., LTE, for the WTRU to monitor downlink (DL) traffic because the Mobility Management Entity (MME) may already have the bearer context for paging and radio bearer activation.

It will be appreciated that, while various examples are disclosed herein in the context of SaMOG, the methods and examples disclosed herein may be generally applicable to an S2b interface. For application to an S2b interface, ePDG may be substituted for TWAN in the examples disclosed herein.

Figure 3:
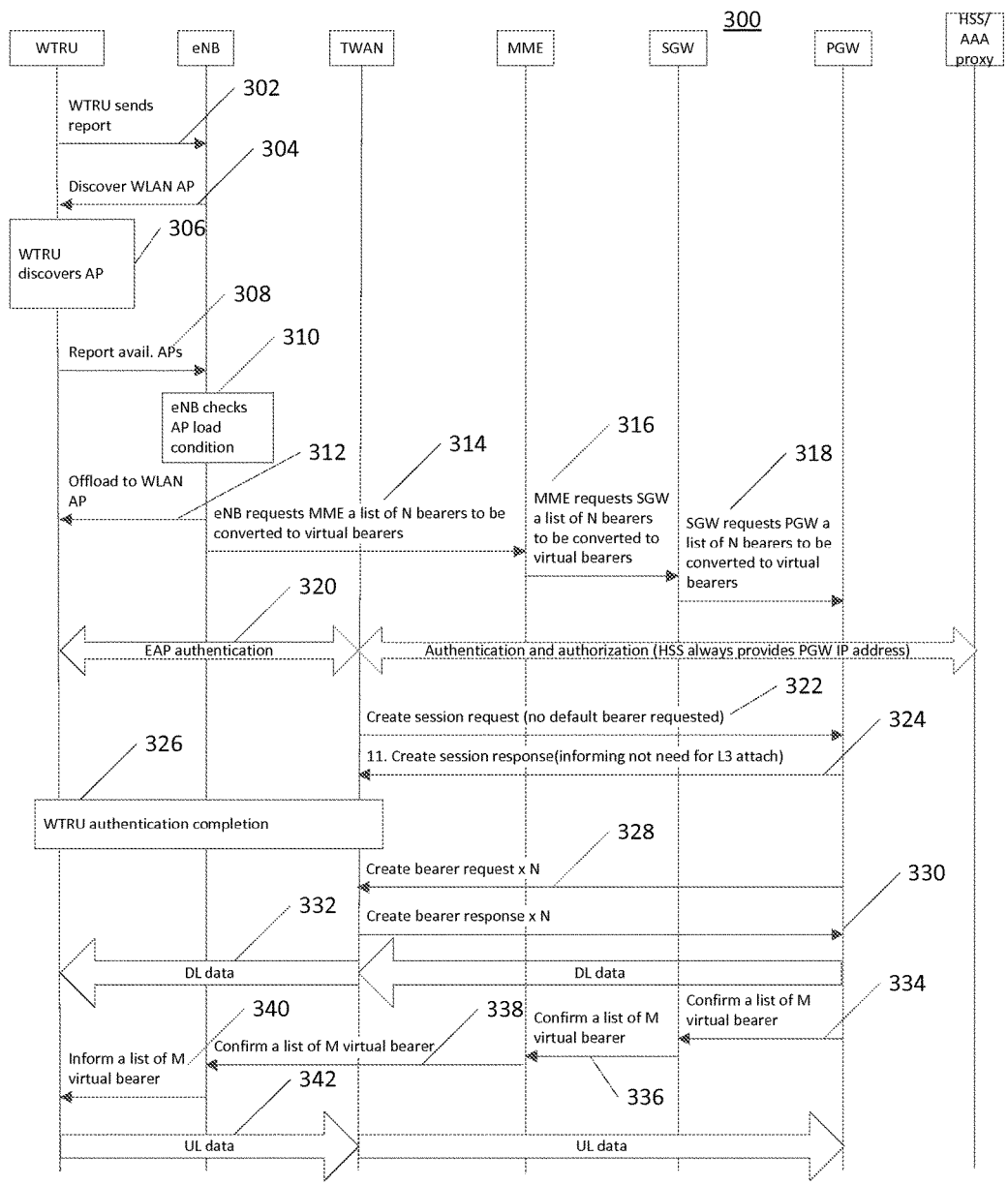
FIG. 3 illustrates an example process flow for offloading to a WLAN and conversion to a virtual bearer.

FIG. 3 illustrates an example process flow 300 for offloading to a WLAN and conversion to a virtual bearer. The procedure may be used by a WTRU to report potential offloading opportunities, and/or by an eNB to determine whether certain traffic is to be offloaded based on cellular and WLAN loading information. After the eNB determines that the offload is to take place, the procedure may maintain the offloaded bearer context in the eNB and EPC and may inform the WTRU when an S2a interface between TWAN and PGW has been setup.

At 302, the WTRU may inform to the eNB opportunities of WLAN offload to the eNB based on ANDSF policy, e.g., if it has started an application that may be subject to WLAN offload per ISRP policies. The WTRU may send the relevant ANDSF policies to the eNB. The WTRU may indicate for which bearer it is indicating that there may be an opportunity to offload. In some examples, the bearer information may be provided at 308 instead or as well.

At 304, the eNB may send a command to the WTRU to start a WLAN discovery or scan process and to report the signal condition of the trusted WLAN APs. At 306, the WTRU may discover a trusted WLAN AP or APs (e.g., by using the information from ANDSF) and may estimate signal strength and link quality of available APs. At 308, the WTRU may report the signal condition (e.g., Signal strength and/or Link Quality), SSID (e.g., MAC address, etc.), and/or the WLAN channel number. The WLAN channel number can be useful from an in-device coexistence point of view. The bearer information may be provided at 308 as well.

At 310, the eNB may determine to offload a particular WTRU to WLAN depending, for example, on the load condition and/or Radio Resource Management (RRM). At 312, the eNB may send a command to offload a WTRU to WLAN. The command may include, for example, an SSID, a channel number, etc. At 314, the eNB may send the MME an S1AP message to request a list of N bearers to be converted to virtual bearers. At 316, the MME may send the SGW a GTP-C message to request a list of N bearers to be converted to virtual bearers. At 318, the SGW may send the PGW a GTP-C message to request a list of N bearers to be converted to virtual bearers. The PGW may receive this message earlier than the S2a create session request, or vice versa. This situation may create a race condition.

To avoid a race condition, the PGW may wait for both messages to come within a certain duration (e.g., timer T_virtual_bearer_creation, timer T_S2a_creation). After a S2a create session request, if the PGW finds that it may satisfy the resource reservation in the S2a interface for the movement of the bearer from EPC to S2a, the PGW may allow the bearer movement, e.g., virtual bearer creation. Otherwise, the PGW may reject the request of virtual bearer creation. If only the virtual bearer request is received by PGW, after waiting for a certain duration of time (e.g., timer T_virtual_bearer_creation), if the PGW does not receive a S2a session creation request for this WTRU, then the PGW may reject the virtual bearer creation request. If a S2a create session is not received within timer T_virtual_bearer_creation, then the PGW may reject the virtual bearer creation. If the S2a create session request comes earlier than the virtual bearer creation request, then PGW may assume that the session request is from a new WTRU that may support a virtual bearer, and the PGW may wait for a certain duration of time (e.g., timer T_S2a_creation) for the virtual bearer creation request for this WTRU from EPC. If the request comes in time, the PGW may make the decision of accepting or rejecting the virtual bearer creation based on whether the PGW finds that it can satisfy the resource reservation in the S2a interface for the movement of the bearer from EPC to S2a. For example, if the PGW finds that it can satisfy the resource reservation, it may allow the bearer movement, e.g., virtual bearer creation. Otherwise, the PGW may reject the request of virtual bearer creation. If the request is not received within timer T_S2a_creation, then the PGW may assume it is an old WTRU and may accept the S2a create session request on a best effort basis. The PGW may reject a virtual bearer creation message received after the time window (e.g., timer T_virtual_bearer_creation). If the PGW does not receive a Create session request at 10, it may start a timer T_virtual_bearer_creation. If the PGW receives a Create session request at 10, the PGW may stop the timer T_S2a_creation that is started at 11.

At 320, the EAP authentication procedure may be initiated and performed. The EAP authentication procedure may involve the WTRU, the TWAN, and/or the 3GPP AAA Server. As part of the EAP authentication procedure, the PDN GW identity may be sent to the TWAN by the 3GPP AAA server. At 322, the TWAN may send a Create Session Request (e.g., IMSI, RAT type, TWAN TEID of the control plane) message to the PDN GW.

At 324, if the SGW has requested the list of N bearers to be converted to virtual bearers from the PGW at 318, the timer T_virtual_bearer_creation may be stopped. If this has not occurred, the timer T_S2a_creation may be started. If the SGW has requested the list of N bearers to be converted to virtual bearers from the PGW at 318, the PDN GW may return a Create Session Response (e.g., PDN GW TEID of the control plane, PDN Type, PDN Address, Cause) message to the TWAN, which may include the IP address or addresses allocated for the WTRU. The timers may be used to avoid a race condition at the PGW, so that the PGW may convert the bearer to a virtual bearer when it has successfully created an S2a interface. If the PGW has not successfully created an S2a interface, the PGW may reject the virtual bearer creation.

At 326, the TWAN may send an EAP success notification to the WTRU, thus completing EAP authentication. At 328, for each virtual bearer signaled at 318, the PDN GW may send a Create Bearer Request message (e.g., IMSI, EPS bearer QoS, PDN GW Address for the user plane, PDN GW TEID of the user plane, Charging Id) to the trusted WLAN access network. At 330, the TWAN may acknowledge the S2a bearer activation to the PGW by sending a Create Bearer Response (e.g., TWAN Address for the user plane, TWAN TEID of the user plane) message. The PGW may associate the S2a GTP tunnel with the EPS bearer ID.

At 332, the downlink (DL) data of the virtual bearer or bearers may be delivered to the WTRU via TWAN. After determining that traffic belongs to the bearer X (according to the TFT), the PGW may send the packets to the associated S2a interface. At 334-336, a GTP-C message may confirm the setup of M virtual bearer or bearers in TWAN and/or associated TWAN QoS. If the TWAN QoS is not signaled, the TWAN QoS may be the same as the QoS of the original EPS bearers. The M virtual bearer or bearers may be the subset of N bearer or bearers requested, which the corresponding S2a GTP tunnels have successfully set up.

At 338, an S1AP message may confirm the setup of M virtual bearer or bearers in TWAN and/or the associated TWAN QoS. At 340, RRC reconfiguration may be performed to reconfigure the virtual bearer or bearers and/or to inform the associated TWAN QoS. A RRCConnectionReconfiguration message may indicate that the bearer X is offloaded to WLAN. The WTRU may resume transmission of uplink (UL) traffic of bearer X. After determining that traffic belongs to the bearer X (e.g., according to the TFT), the WTRU may send the packets to the WiFi interface. If the bearer X is of RLC AM mode, the context of PDCP SN may be remembered by both the eNB and the WTRU until the RRC connection is released. The RRCConnectionReconfiguration message may also configure reporting to the eNB for measurements/detection of QoS, inactivity, and/or the aggregate bit rate in WLAN. The aggregate bit rate reporting to the eNB may be used for UE-AMBR monitoring. At 342, the WTRU may send UL data of the virtual bearer or bearers.

If the timer T_virtual_bearer_creation expires, then at 334-338, instead of confirming the setup of virtual bearers, the PGW may instead inform the failure of TWAN association. The eNB may inform the WTRU of the cancellation of the WLAN offloading. If the timer T_S2a_creation expires, and if the TWAN is also used for SaMOG phase 1, then the PGW may perform an IP-CAN session establishment procedure and/or other procedures. Otherwise, the PGW may reject the create session request.

Figure 4:
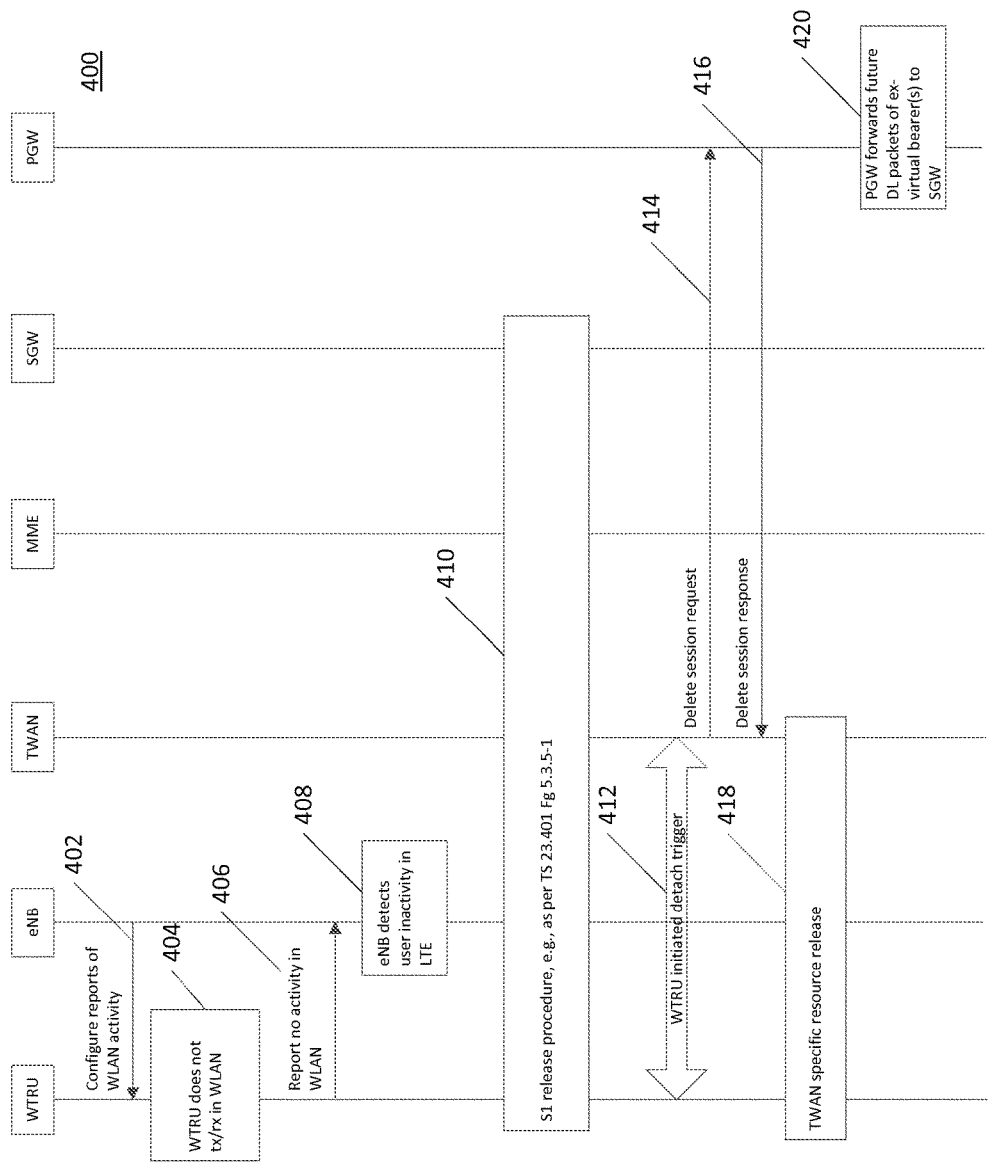
FIG. 4 illustrates an example process flow for an S1 release procedure.

FIG. 4 illustrates an example process flow 400 for an S1 release procedure. An eNB may use this procedure to determine whether a WTRU is active. If there is no WTRU activity, the eNB may transition the WTRU to an idle state. During the idle state, the WTRU may monitor the LTE access network for downlink (DL) traffic. Before the WTRU returns to the idle state, the PGW may be informed to forward future DL traffic of the offloaded traffic to the original GTP tunnel to the SGW for paging.

At 402, the eNB may configure a measurement report of WLAN activity. This can also be combined with 340 of the offloading procedure depicted in FIG. 3. At 404, the WTRU may detect that criteria specified at 402 has been satisfied, e.g., that the WTRU is not transmitting or receiving in the WLAN. At 406, the WTRU may report that the criteria specified at 402 has been satisfied. At 408, the eNB may detect WTRU inactivity on LTE.

At 410, the eNB may initiate an S1 release procedure. The MME and SGW may unmark the virtual bearer or bearers. The SGW may inform the PGW that DL virtual bearer traffic is to be forwarded to the SGW via the original S5/S8 GTP tunnel. At 412, the WTRU may send a disassociation or deauthentication notification, for example, according to IEEE standard 802.11-2007.

At 414, the TWAN may send a Delete Session Request message to the PDN GW. At 416, the PDN GW may acknowledge the message with a Delete Session Response (Cause). The PGW may forward future FL packets of the virtual bearer(s) to the existing S5/S8 GTP tunnel. At 418, the TWAN may locally remove the WTRU context and may deauthenticate and/or disassociate the WTRU at Layer 2, for example, according to IEEE standard 802.11-2007. At 420, the PGW may forward future DL packets of the former virtual bearer or bearers to the SGW.

Figure 5:
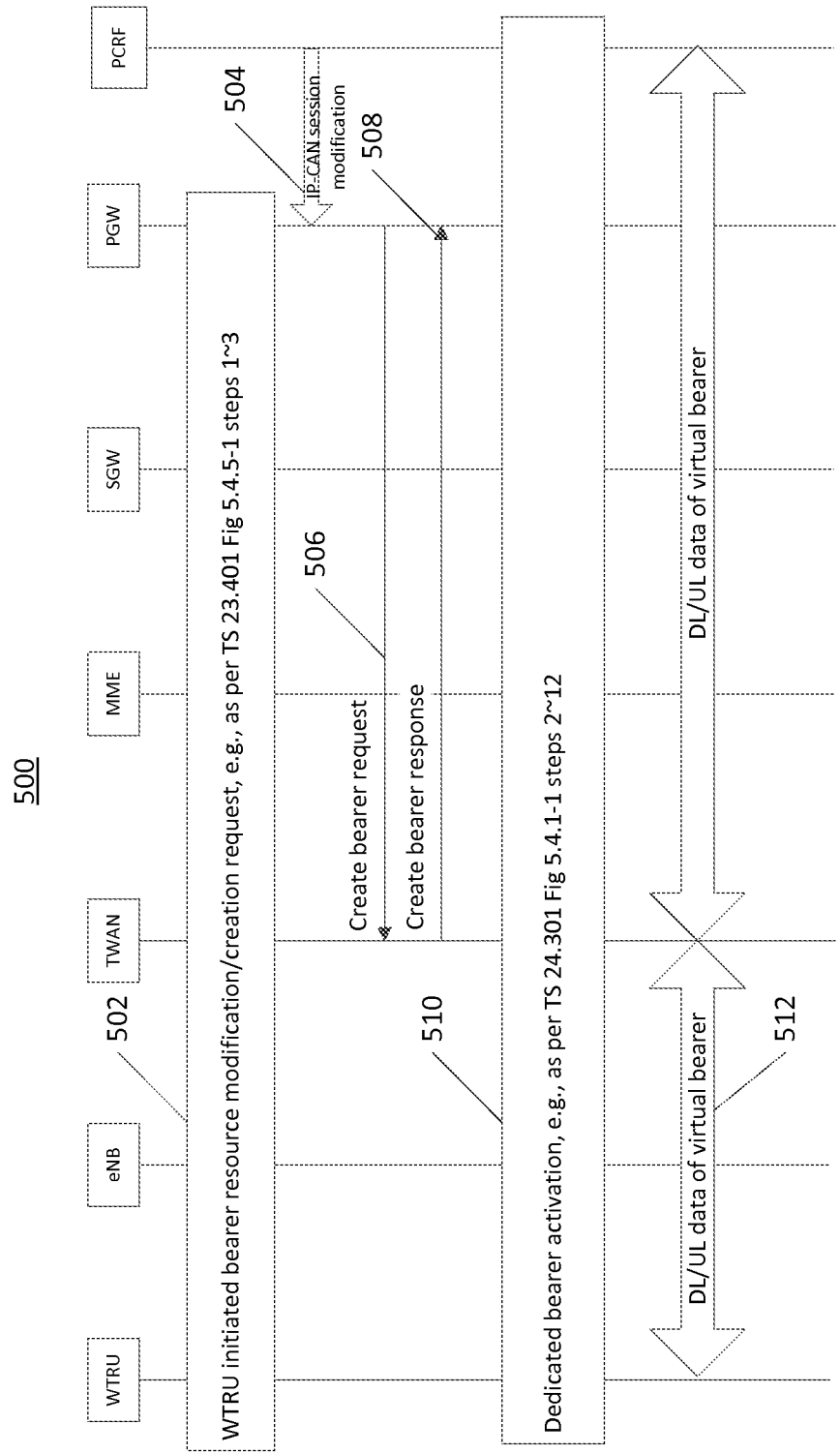
FIG. 5 illustrates an example process flow for a bearer resource allocation procedure.

FIG. 5 illustrates an example process flow 500 for a bearer resource allocation procedure. This procedure may be performed when a WTRU requests a bearer resource or when a Policy Charging and Rules Function (PCRF) determines that a bearer is to be created. Based on an existing S2a bearer or bearers, the PGW may determine to create an S2a bearer in TWAN. The context of the bearer may be signaled via EPC and eNB to the WTRU for filtering, control, and/or monitoring.

At 502, if the WTRU requests bearer resource allocation or modification to MME, the WTRU-initiated bearer modification/creation request procedure may be performed, for example, as per TS 23.401. At 504, in WTRU- or PCRF-initiated bearer creation, the PCRF may send a PCC decision provision (e.g., QoS policy) message to the PDN GW.

At 506, if there are already virtual bearers offloaded to TWAN, the PGW may determine to offload the new bearer to TWAN. The PDN GW may send a Create Bearer Request message (e.g., IMSI, EPS bearer QoS, PDN GW Address for the user plane, PDN GW TEID of the user plane, Charging Id) to the trusted WLAN access network. At 508, the TWAN may acknowledge the S2a bearer activation to the PGW, for example, by sending a Create Bearer Response (e.g., TWAN Address for the user plane, TWAN TEID of the user plane) message.

At 510, dedicated bearer activation may be performed on the EPC side, for example, as per TS 23.401. The bearer may be indicated as a virtual bearer. At 512, the WTRU may start sending uplink (UL) data on TWAN for the new bearer.

Figure 6:
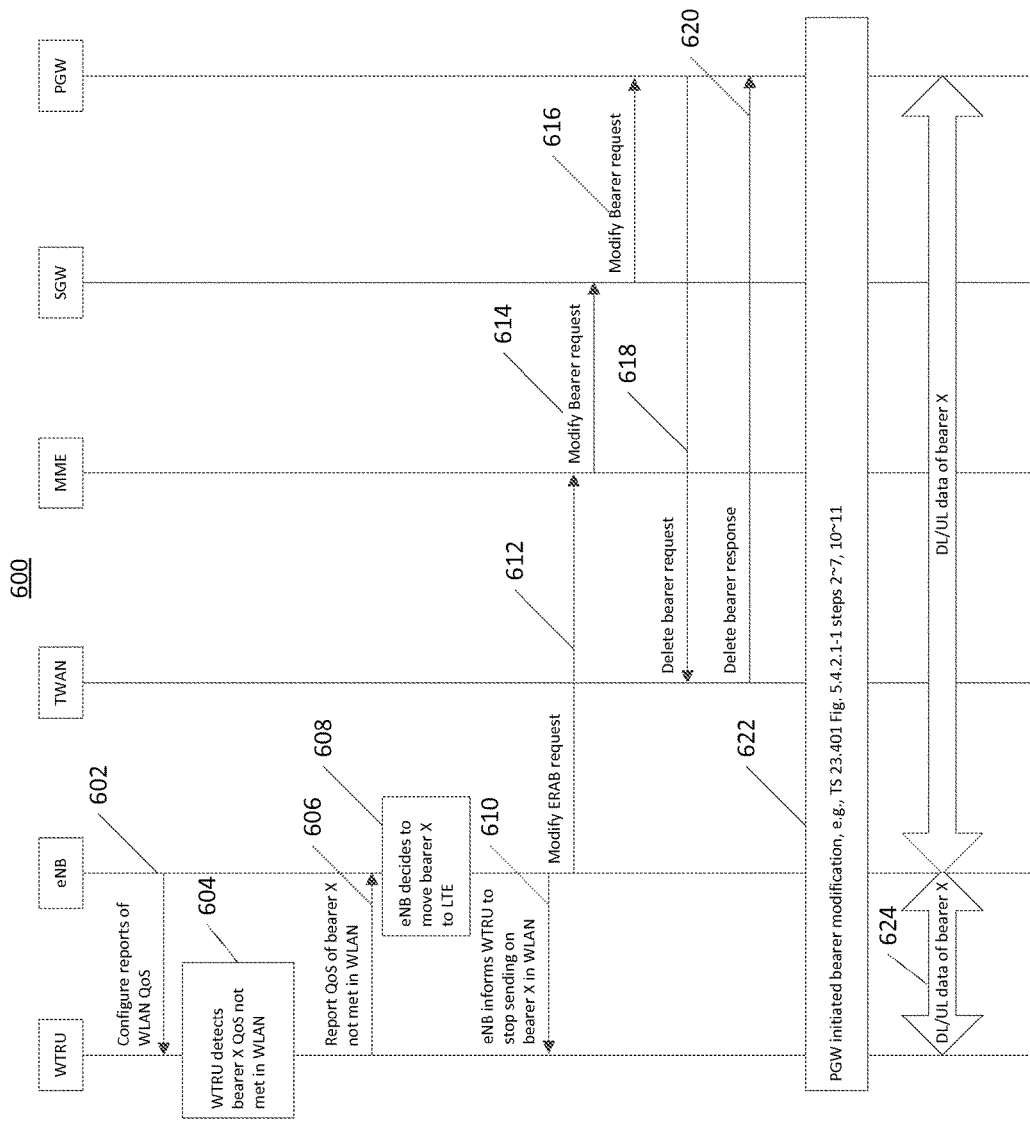
FIG. 6 illustrates an example process flow for offloaded bearer monitoring and mobility to LTE initiated by an eNB.

FIG. 6 illustrates an example process flow 600 for offloaded bearer monitoring and mobility to LTE initiated by an eNB. This procedure may be used for moving an offloaded bearer back to the LTE network, based on the access network load and WLAN QoS reported by the WTRU. At 602, the eNB may configure a measurement report of the offloaded bearer QoS. The configuration may contain one or more trigger criteria, which may be based on one or more thresholds of certain QoS parameters. This can also be combined with 340 of the offloading procedure depicted in FIG. 3.

At 604, the WTRU may detect that the report triggering criteria specified at 602 has been satisfied, e.g., that bearer X QoS is not met in WLAN. At 606, the WTRU may report the QoS observed in WLAN. At 608, the eNB may determine to move an offloaded bearer X to LTE, for example, based on cellular loading, the reported QoS, and/or the QoS parameters of the bearer context. At 610, the eNB may request the WTRU to stop sending UL traffic of bearer X in WLAN. At 612, the eNB may send an S1AP message to request the offloaded bearer to be move to LTE.

At 614, the MME may request that the bearer modification (e.g., new or extending the existing GTP-C message) of bearer X be moved to LTE access. At 616, the SGW may request that the bearer modification of bearer X be moved to LTE access. At 618, the PDN GW may send a Delete Bearer Request (e.g., PTI, EPS Bearer Identity, Causes) message to TWAN. The TWAN may acknowledge the bearer deactivation to the PDN GW at 620 by sending a Delete Bearer Response (EPS Bearer Identity) message.

At 622, a PGW-initiated bearer modification procedure may be initiated, for example, per TS 24.301, indicating the procedure may not be an QoS update but may rather be for moving the offloaded bearer to LTE. PGW, SGW, MME, eNB, and WTRU may mark the virtual bearer back to an actual bearer. At steps 4-6 of TS 24.301 clause 5.4.2.1, the encapsulated session management message may not have been sent. An RRCConnectionReconfiguration message may indicate that the bearer X is not offloaded. The WTRU may resume UL transmission of bearer X traffic if it has been suspended at 610. After determining that traffic belongs to the bearer X (e.g., according to the TFT), the WTRU and/or PGW may send the packets to the Uu/S5/S8 interface. If bearer X is of RLC AM mode, the PDCP SN may be resumed from the next SN of the last frozen PDCP context of the bearer X in the current RRC connection on the eNB and the WTRU. Other LTE protocol instances or RoHC instance may be restarted based on the RRCConnectionReconfiguration. 618-620 may be performed after 622. A PGW may stop forwarding DL bearer X packets to TWAN at 622. At 624, the UL/DL traffic of bearer X may resume on LTE.

Figure 7:
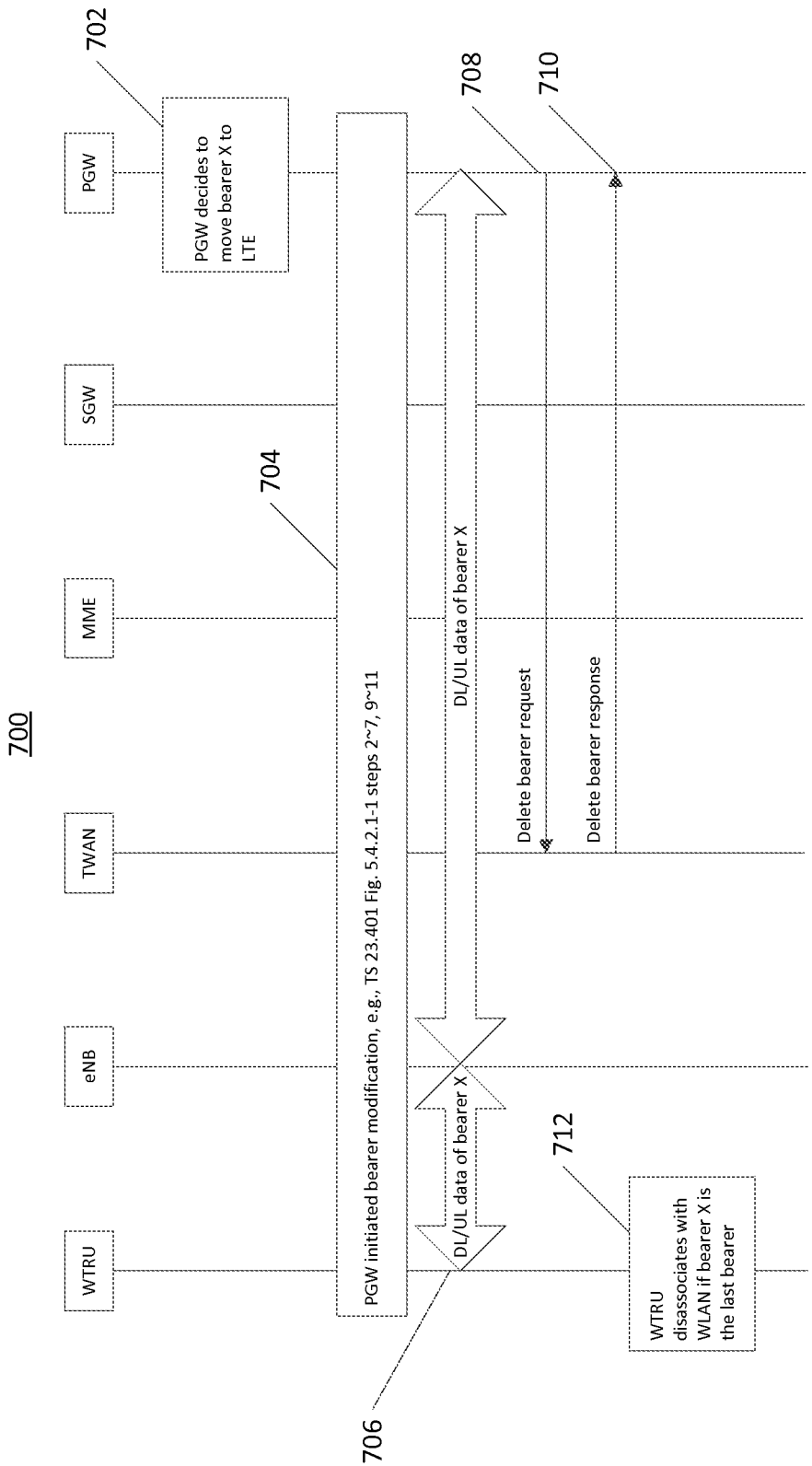
FIG. 7 illustrates an example process flow for offloaded bearer monitoring and mobility to LTE initiated by a PGW.

FIG. 7 illustrates an example process flow 700 for offloaded bearer monitoring and mobility to LTE initiated by a PGW. This procedure may be used for moving an offloaded bearer back to the LTE network, based, for example, on the QoS of the offloaded bearer. If the QoS is not met, the PGW may initiate the procedure of moving the offloaded bearer back to LTE.

At 702, the PGW may decide to move bearer X to LTE. At 704, the PGW-initiated bearer modification procedure may be initiated similarly to 622 of FIG. 6. The PGW may stop forwarding DL bearer X packets to TWAN. PGW, SGW, MME, eNB and WTRU may mark the virtual bearer back to actual bearer. At 706, the UL/DL traffic of bearer X may resume on LTE. After an implementation specific time, PGW may send a Delete Bearer Request (PTI, EPS Bearer Identity, Causes) message to TWAN at 708. At 710, TWAN may acknowledge the bearer deactivation to the PDN GW, for example, by sending a Delete Bearer Response (EPS Bearer Identity) message. At 712, if the bearer X is the last bearer offloaded to WLAN, the WTRU may disassociate from the TWAN.

Upon circuit-switched fallback (CSFB) to an access technology in which packet access may not be possible, the MME may receive a suspend request from SGSN. The MME may initiate, for example, 316, 318, 322, 324, 328, 330, 334, and/or 336 of FIG. 3 for the default bearer of the PDN connection, which can be offloaded to WLAN. During the CS call, the WTRU may treat the bearers as offloaded (e.g., virtual) bearers and may send and receive packets via WLAN. On resestablishment after radio link failure (RLF), if the eNB still uses the WTRU context, it may inform the WTRU virtual bearer status. If it is the new cell, the MME my inform the eNB, and the eNB may inform the WTRU about virtual bearer status. On return to LTE by performing TAU, in the TAU accept message MME may indicate the bearer status of offloaded and non-offloaded bearer(s), if a U-plane is established. If a U-plane is not established, the WTRU may mark all bearers as non-offloaded and/or non-virtual upon NAS signaling connection release.

In order to reduce or minimize battery consumption associated with measuring and scanning for WiFi access points, the WTRU may reduce or minimize the scanning time. Methods are described herein to improve or optimize measurement procedures, discovery, and connection to a WiFi access point integrated with or cooperating with a 3GPP (e.g., eUTRA or UTRA) network.

When the WTRU is offloaded to WLAN and no more data exchange happens in the WLAN (while offloaded to WLAN) for a certain duration of time, the WTRU may indicate this to eNB so that the eNb can release the connection in LTE and/or WLAN. When this happens, the eNB may also start the process of converting a virtual bearer back to a normal bearer or it can terminate the bearer as well.

Conflict may be resolved between an eNB decision and ANDSF policy. In an example scenario, an ANDSF or HS2.0 policy may be present and valid in the WTRU. The WTRU may monitor its traffic, applications, services, and/or other policies. If, as per those policies, it is possible to offload to WLAN, the WTRU may inform to the eNB in a message, such as a new or existing RRC message, that there exists an opportunity for offload. However, the WTRU may not begin WLAN scanning, authentication with WLAN, and/or an S2a related procedure until the WTRU receives a command from the eNB. The eNB may take this information into account and may check its load condition or a policy database. The eNB may command the WTRU to start a WLAN scan and to report the signal condition of nearby APs. Based on WiFi measurement, RAN load, etc., the network may command the WTRU to offload to WLAN.

The eNB may indirectly indicate to the WTRU that it would prefer that the WTRU perform an offload. In order to avoid the WTRU performing unnecessary WLAN scanning, the WLAN measurements may be triggered when the RSRP of the serving cell falls below a value of S-measure, configured for WLAN.

An OffloadDesired measurement event may be specified to compare a serving cell against a configured threshold Offload_Threshold. The eNB may reconfigure the threshold based on parameters, for example, for a WTRU load, cell congestion level, etc., to a high value that may indicate to the WTRU that an offload is preferred from the eNB's point of view.

An entering condition may be characterized as:

Serving Cell($Mp$)+Hysteresis+
    Offload_Offset<Offload_Threshold     Entering condition A leaving condition may be characterized as:

Serving Cell($Mp$)+Hysteresis+
    Offload_Offset>Offload_Threshold     Leaving condition When an event is triggered, the WTRU may be configured to perform one or more of a number of actions. For example, when an entering condition measurement event is triggered and an 802.11 network is available, the stack may send an indication to the 802.11 WiFi module to start measurements on the 802.11 RAT. When a leaving condition measurement event is triggered and an 802.11 network is available, the stack may send an indication to the 802.11 WiFi module to stop measurements on the 802.11 RAT. A variable OffloadDesiredIndication may be maintained in the WTRU. When the entering condition measurement event is triggered, the variable OffloadDesiredIndication may be set, and the value may be sent to the higher layers. When the leaving condition measurement event is triggered, the variable OffloadDesiredIndication may be reset, and the value may be sent to the higher layers. These procedures may be triggered with the new measurement event or using an existing measurement event, for, e.g., A2.

The WTRU protocol stack or higher layers may perform one or more of a number of actions. For example, the variable OffloadDesiredIndication may be used to trigger the ANDSF policy engine to start executing to determine if there are Access Points in the vicinity that are suitable for offload and traffic available to be offloaded. Policies or rules may be installed in the WTRU's ANDSF policy engine that consider the variable OffloadDesiredIndication into consideration. Based on the current value of the variable, the policy rules may perform different actions. For example, if the OffloadDesired indication is on, then the rules for which traffic classes are eligible to be offloaded may be different, e.g., all traffic classes may be considered eligible.

The variable OffloadDesiredIndication may be used by the higher levels (e.g., the connection manager) to bypass the ANDSF policy engine or rules. For example, as a function of the WTRU user subscription profile, the WTRU higher layers may be configured or instructed by the network, e.g., during RRC connection establishment or PDN connection establishment, to bypass the ANDSF policy engine or rules upon the reception of the variable OffloadDesiredIndication from the lower layer, e.g., RRC or PHY.

The variable OffloadDesiredIndication, e.g., leaving condition, may be used to indicate to the high layers, e.g., the connection manager, the prohibition of offload for a certain amount of time, e.g., controlled by a prohibit timer. Upon the reception of the variable OffloadDesiredIndication, the WTRU high layers may autonomously decide to prohibit offload for a certain amount of time, e.g., controlled by a prohibit timer. The variable OffloadDesiredIndication, e.g., leaving condition, may be used to trigger from the higher layer the offload from WiFi RAT to non-WiFi RAT (e.g., UTRAN RAT, LTE RAT).

In addition to measurement parameter configuration, the higher layers (e.g., the ANDSF policy engine) may determine that the conditions to perform an offload are optimum and may send an indication to the access stratum, e.g., an OffloadAvailable flag. For example, the higher layers may determine that suitable APs are in vicinity of the WTRU and eligible traffic classes are running in the WTRU that can be offloaded to WiFi based on ANDSF rules. When the access stratum receives the OffloadAvailable flag, it may trigger transmission of a measurement report.

Upon receiving the indication, the RRC may scale down an S-measure using a configured scaling factor and may send a measurement report that may include neighbor inter-RAT and 802.11 measurements. The scaling may be applied to a configured offset Offload_Offset, which may be used in the measurement event equations as disclosed herein. Upon receiving a WiFi measurement report, the eNB may conclude that there is some traffic in the WTRU that can be offloaded to the WLAN as per ANDSF policy.

The eNB may configure the WTRU with measurement scaling parameters that may be used for interworking with WLAN, for example, during the connection establishment or during connection reconfiguration. The WTRU may make the traffic offload decisions. The scaling parameters setting may take into account the user subscription profile. The eNB may broadcast the measurement scaling parameters as part of a system information broadcast message.

An example of a measurement scaling parameter may be, for example, low, medium, or high values for S-measure or low range, medium, and high range values for S-measure. A hysteresis may be defined around each of the configuration values of S-measure. Other examples of measurement scaling parameter may include values for Hysteresis, Offload_Offset, and/or Offload_Threshold.

The WTRU may use the measurement scaling parameters to dynamically adjust how frequently it measures the WLAN APs, taking into account its buffer occupancy or traffic volume.

For example, if the WTRU buffer occupancy or traffic volume is low, the WTRU may trigger the WLAN measurement when the RSRP of the serving cell falls below the low value of S-measure that the WTRU has been configured with. How long the WTRU raffle volume may remain low before a WLAN measurement may be triggered may be controlled by a timer. Similarly, how long the RSRP of the serving cell may remain below the low value of S-measure before a WLAN measurement may be triggered may be controlled by a timer. This start of the WLAN measurement may correspond to an OffloadDesired measurement event (e.g., entering condition). The WTRU may stop the WLAN measurement when the RSRP of the serving cell is above the low value of S-measure that the WTRU has been configured with. This may correspond to the OffloadDesired measurement event, e.g., leaving condition. How long the RSRP of the serving cell may remain above the low value of S-measure before the WLAN measurement may be stopped may be controlled by a timer.

If the WTRU buffer occupancy or traffic volume is high, the WTRU may trigger the WLAN measurement when the RSRP of the serving cell falls below the high value of S-measure that the WTRU has been configured with. How long the traffic volume remains high before a WLAN measurement may be triggered may be controlled by a timer. Similarly, how long the RSRP of the serving cell may remain below the high measure of S-measure before a WLAN measurement may be triggered may be controlled by a timer. The start of the WLAN measurement may correspond to the OffloadDesired measurement event, e.g., entering condition. The WTRU may stop the WLAN measurement when the RSRP of the serving cell is above the high value of S-measure that the WTRU has been configured with. This may correspond to the the OffloadDesired measurement event, e.g., leaving condition. How long the RSRP of the serving cell may remain above the high value of S-measure before the WLAN measurement may be stopped may be controlled by a timer.

If the WTRU buffer occupancy or traffic volume is medium, the WTRU may trigger the WLAN measurement when the RSRP of the serving cell falls below the medium value of S-measure that the WTRU has been configured with. How long the WTRU traffic volume may remain medium before a WLAN measurement may be triggered may be controlled by a timer. Similarly, how long the RSRP of the serving cell may remain below the medium value of S-measure before a WLAN measurement may be triggered may be controlled by a timer. This start of the WLAN measurement may correspond to an OffloadDesired measurement event, e.g., entering condition. The WTRU may stop the WLAN measurement when the RSRP of the serving cell is above the medium value of S-measure that the WTRU has been configured with. This may correspond to an OffloadDesired measurement event, e.g., leaving condition. How long the RSRP of the serving cell may remain above the medium value of S-measure before the WLAN measurement may be stopped may be controlled by a timer.

Examples similar to those disclosed herein may be established using measurement configuration parameters, e.g., Hysteresis, Offload_Offset, Offload_Threshold. For example, the entering condition may be realized if the WTRU traffic volume is low and the entering condition may be fulfilled for low measurement rate measurement parameters (e.g., Hysteresis, Offload_Offset, Offload_Threshold). Similar options may be realized for medium and high measurement rates.

The WTRU stack may send the OffloadDesiredIndication to the WTRU higher layer, e.g., the connection manager and/or ANDSF policy engine. For example, upon reception of the OffloadDesiredIndication variable, the WTRU higher layer may evaluate or execute the connection manager and/or ANDSF policy rules and, as a result of the evaluation, may offload traffic to the WTRU WiFi RAT. This may be case, for example, for an OffloadDesiredIndication resulting from an OffloadDesired measurement event entering condition case.

Upon reception of the OffloadDesiredIndication variable, the WTRU higher layer may evaluate or execute the connection manager and/or ANDSF policy rules and, as a result of the evaluation, may offload traffic to the WTRU non-WiFi RAT (e.g., UTRAN RAT, LTE RAT). This may be the case for an OffloadDesiredIndication resulting from an OffloadDesired measurement event leaving condition case.

The OffloadDesiredIndication, e.g., leaving condition, may be used to indicate to the higher layers, e.g., the connection manager, the prohibition of offloading for a certain amount of time, e.g., controlled by a prohibit timer. Upon reception of the OffloadDesiredIndication variable, the WTRU high layers may autonomously decide to prohibit offloading for a certain amount of time, e.g., controlled by a prohibit timer.

An ANDSF or HS2.0 policy may be present, but not valid, e.g., expired, in the WTRU. The WTRU may attempt to get a new policy from ANDSF. If the WTRU does not receive a new policy and an opportunity for offloading to WLAN exists under the old policy, the WTRU may indicate the existence of an offloading opportunity to the eNB, for example, using a new or existing RRC message. The WTRU may indicate that the policy has expired, and/or may indicate how long ago the policy expired.

No ANDSF or HS2.0 policy may be present in the WTRU. The WTRU may indicate to the eNB that it does not have a policy at any time during a connected state or during a transition to the connected state. If the WTRU receives an ANDSF policy during a connection, the WTRU may inform the eNB that it has received a policy if it has earlier reported that it did not have an ANDSF policy during the same connection.

There may be a conflict between an eNB decision relative to offloading and ANDSF policy. If there is such a conflict, the WTRU may indicate the conflict to the eNB. A conflict can happen due to several reasons, including, but not limited to, a policy update, receiving a policy in the WTRU after offloading where no policy was present before offloading, etc. Once the conflict is indicated to the eNB then eNB may make a decision to either proceed with the offload or to stop the offload to WLAN. The eNB can make this decision, for example, based on an operator policy configured in the eNB to handle the conflict cases based on the scenario and policy database. The eNB may be configured to have the final decision authority to resolve the conflict.

The WTRU may indicate the bearer for which it is indicating that there exists an opportunity of offload, and/or the bearer for which there is conflict between the eNB decision of offload and ANDSF policy, and/or whether the WTRU is roaming.

The WTRU may indicate to the eNB the summary of an ANDSF policy because of which the WTRU is indicating to the eNB that there exists an opportunity of WLAN offload. The WTRU may indicate to the eNB the summary of an ANDSF policy because of which the WTRU is indicating that there is a conflict between the eNB decision of WLAN offload and ANDSF policy. The summary of the ANDSF policy may include, for example, application, service, particular traffic type, certain file (or data) size, etc.

A proximity indicator may inform the eNB of an opportunity of WLAN offload based on an ANDSF policy, an indication of conflict between eNB decision and ANDSF policy, and/or a summary of ANDSF policy that has caused the indication of an WLAN offload opportunity or that has caused a conflict between the eNB decision to offload to WLAN and ANDSF policy.

During an intra LTE handover, the source eNB may provide the conflict information to the target eNB in the handover context transfer.

In an example, minimization of drive tests (MDT) may be used for WLAN or during an offload to WLAN. For example, an operator may be interested in LTE MDT even when a user is offloaded to WiFi. As another example, an operator may be interested in WiFi-related measurements, as WiFi may also be deployed by the operator or by a partner. At each MDT measurement (e.g., logging or immediate), it may be indicated whether a WTRU is offloaded to WiFi and, if so, to which AP. The eNB may provide this information by writing it into a trace before providing it to a trace collection entity (TCE).

The coverage area of a WLAN may be relatively small, so a WiFi SSID, a BSS ID, or another ID may be used as location information for MDT purposes. This information can be useful if detailed location information, such as GNSS coordinates, may not be available. This information may be provided by the WTRU. The eNB can provide this information by writing it into a trace before providing it to a TCE.

WiFi signal strength along with its ID can be also captured for MDT purposes. In the case of logged MDT, it can be done by the WTRU. In the case of immediate MDT, it can be provided by the WTRU, or it can be taken by the eNB from other measurement reports that may be provided earlier by the WTRU. The WTRU may perform measurement for MDT logging or reporting for APs that may belong to same operator and that may be part of a PLMN list. The MDT PLMN list may indicate the PLMNs where measurement collection and log reporting is allowed. The MDT PLMN list may be a subset of the EPLMN list and the RPLMN at a logged measurement configuration. The WTRU may perform MDT for WLAN APs that include PLMN from the list in its beacon. A list of WLAN APs may be configured as part of a logging area configuration. The WTRU may log MDT data for APs that are configured in the logging area. The WTRU may also record WiFi channel information for MDT purposes. For Accessibility measurement, if reestablishment is logged, then the log may indicate whether the WTRU is offloaded to WiFi and may also indicate, for example, which SSID or any other ID of WLAN AP, which channel, the type of WLAN AP (e.g., a/b/g/n, etc.), level of interference, and/or WLAN link quality. For radio link failure (RLF), HOF report offload information may be included. The latest available radio measurements for any frequency or RAT for accessibility measurement may include the WiFi signal strength and may also be included. The number of WiFi APs that can be logged at the time of MDT configuration may be included. For a RLF/HOF report, detailed location information may be sent if it is available; this information may include WiFi location.

There may be M4 for Data Volume measurement separately for DL and UL, per QCI per WTRU, by the eNB. When the WTRU is offloaded to WLAN, the eNB may not be aware of the data volume at WLAN. The WTRU may indicate the data volume in WLAN when it is offloaded to eNB. This reporting may be based on the configuration for the reporting or whether a certain threshold of data volume has been reached. The reporting may be time-based. The WTRU may log the data volume separately for LTE and WLAN or a combined data volume for both, or only for WLAN when offloaded to WLAN.

There may be M5 for Scheduled IP Throughput for MDT measurement separately for DL and UL, per RAB per WTRU, and per WTRU for the DL, per WTRU for the UL, by eNB. When the WTRU is offloaded to WLAN, the eNB may not be aware of the scheduled IP throughput volume at WLAN. The WTRU may indicate the scheduled IP throughput in WLAN when it is offloaded to eNB. This reporting can be based on configuration for the reporting or on whether a certain threshold of scheduled IP throughput has been reached. It can also be time-based. The WTRU may log the scheduled IP throughput separately for LTE and WLAN or combined scheduled IP throughput for both, or only for WLAN when offloaded to WLAN.

As part of an MDT log available indicator, the WTRU may indicate that the available log is for the case the WTRU is offloaded to WLAN. Several scenarios may arise when the WTRU is offloaded to WLAN. For example, after offloading, the WLAN signal strength and/or link quality may deteriorate. The AP may become congested after offloading. A WTRU may move from one AP to another AP due to mobility. A user may switch off the WLAN part of a WTRU. There may be no more data exchange while the WTRU is offloaded to WLAN for a certain duration of time. It may be helpful to detect this condition because, if it is reported to LTE, the LTE connection may be released, possibly after a connection release timer expires. The WTRU may not be able to meet QoS, or there may be a poor user experience. A connection may be lost with the WLAN AP.

As part of MDT logging for WLAN offload, at least one of the above conditions may be logged and/or reported as part of MDT. Due to tighter integration of WLAN and RAN, the eNB might be aware of these scenarios. The eNB may provide this information into a trace before providing the trace to a trace collection entity (TCE).

A number of scenarios may result in a discrepancy or conflict between ANDSF policy and an eNB decision of offload to WLAN. As part of MDT, the conflict between the eNB decision and ANDSF policy can be logged and/or reported by the WTRU or by the eNB to a TCE. The report may include the scenario of conflict, the final decision by eNB to resolve the conflict, etc.

The WTRU may log or report which bearer is offloaded to WLAN, and/or the start and/or end time of offload per bearer. The eNB may do this as well before providing a trace to TCE. The WTRU can also log which application and/or service was offloaded to WLAN and/or because of which ANDSF policy.

If there is a change in the WLAN AP to which the WTRU is offloaded, the change in AP can be logged or reported by the WTRU or provided by the eNB if the eNB is aware of it, e.g., when the WTRU is in a connected state or for immediate MDT, to TCE.

As part of WTRU capability reporting, the WTRU can report its capability of performing MDT for WLAN offload.

Figure 8:
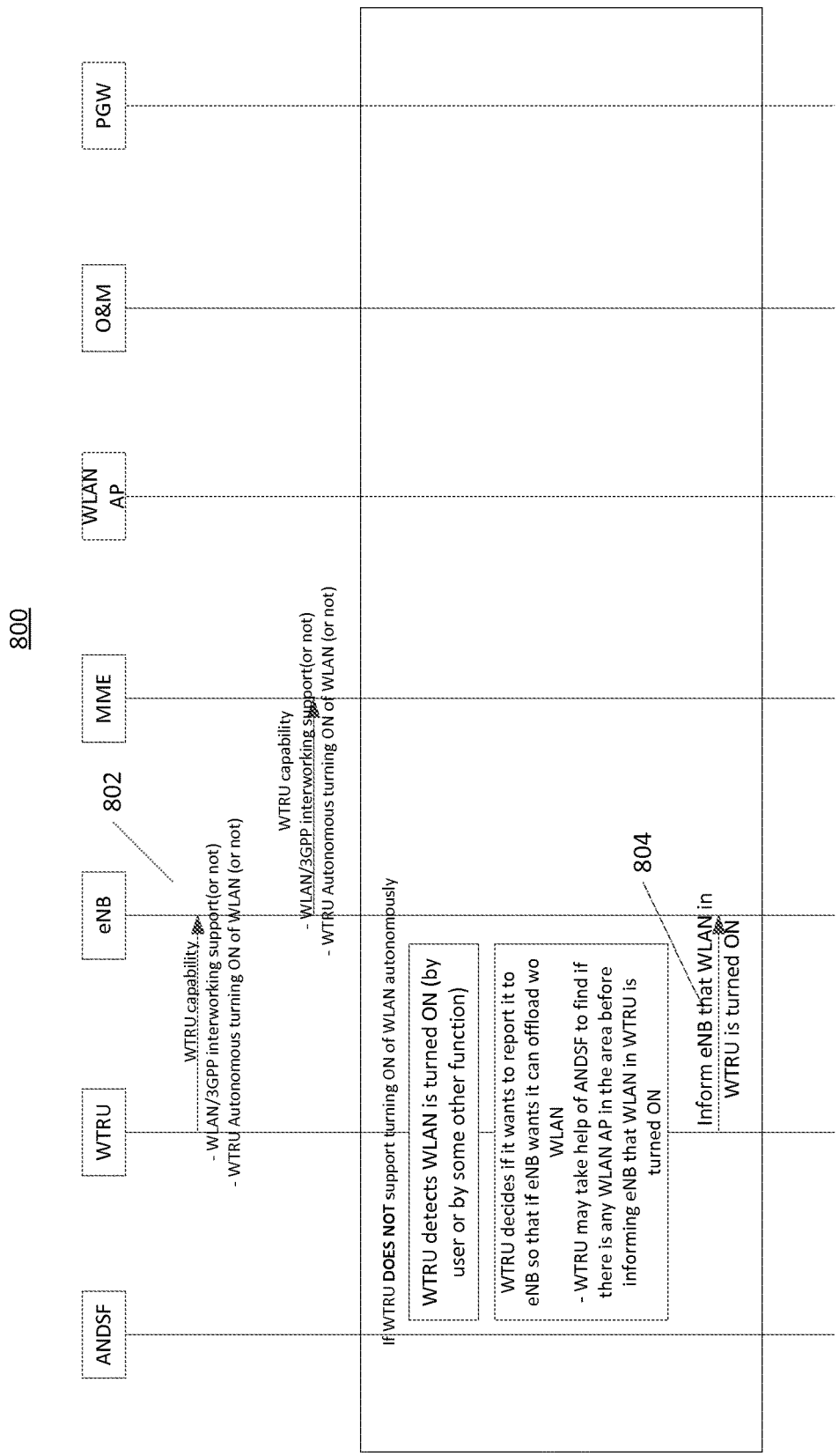
FIG. 8 illustrates an example process flow for signaling a WTRU capability.

FIG. 8 illustrates an example process flow 800 for signaling a WTRU capability. At 802, the WTRU may indicate its capability of support of WLAN offload to the eNB. The WTRU may also report its capability of autonomously turning on its WiFi component, e.g., in response to an eNB command to discover and scan available WLAN AP. If the WTRU does not have the capability of autonomously turning on the WLAN, e.g., in response to an eNB command to discover and scan available WLAN AP, then a signaling message from the WTRU to eNB at 804 may inform the eNB when WLAN is turned ON so that the eNB can perform the process of WLAN offload.

When the eNB sends a command to the WTRU to turn on the WLAN for offload, the WTRU may indicate this to the user for his/her action, for example, using a pop up screen message. If the user elects not to turn on the WiFi, the WTRU may indicate this decision to the eNB in response to the command it received from eNB. If there is no response from user to turn on the WiFi, then after a certain duration the WTRU may indicate to the eNB that no action was taken by the user to turn on the WiFi.

In another example, if the WTRU earlier reported that it has capability to autonomously turn on the WiFi when the eNB sends a command to do so as part of capability signaling or any other signal, then, if after some time the user configures certain settings in such a way that prohibits the WTRU from autonomously turning on WiFi after receiving a command from eNB, the WTRU may indicate this change to the eNB. If the WTRU has already been offloaded to WLAN when the user configures the setting to prevent WLAN offload, then it may be informed to the user for action by the user and to the eNB. The indication to the eNB may include an indication of the action by the user.

Figure 9:
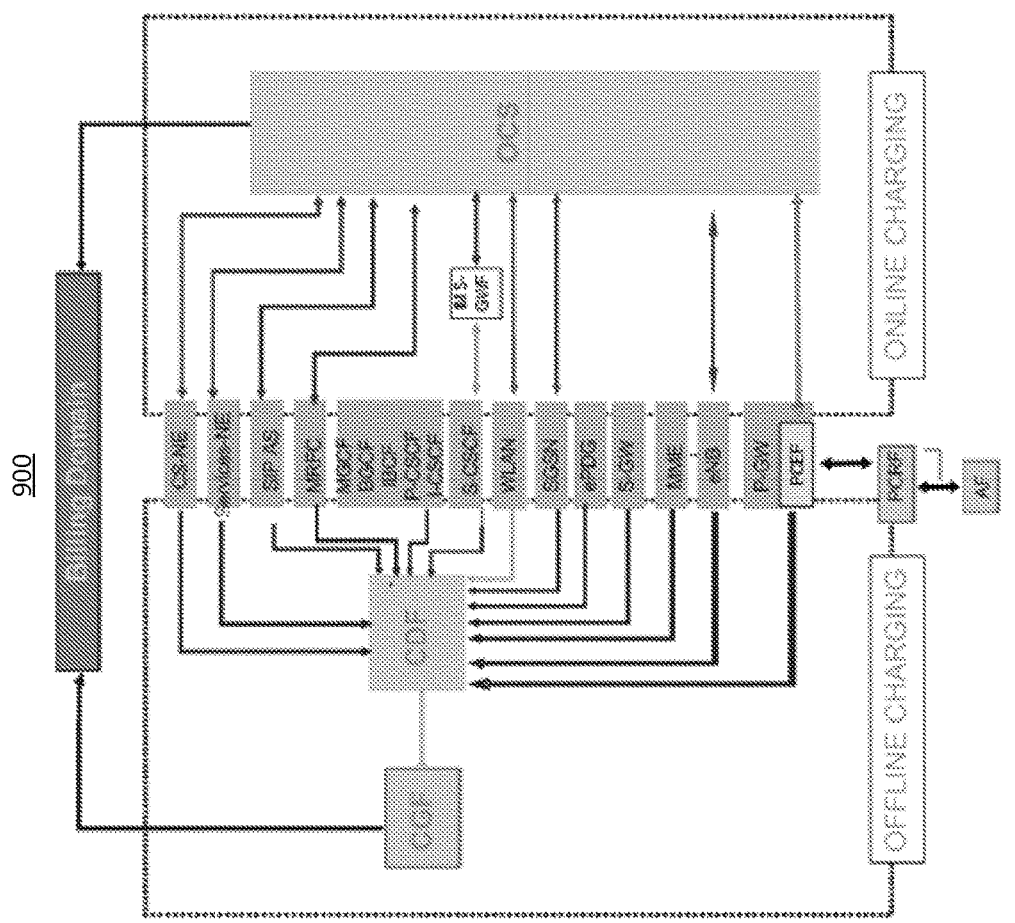
FIG. 9 is a diagram illustrating an example logical charging architecture and information flows for offline and online WLAN charging.

FIG. 9 illustrates an example logical charging architecture 900 and information flows for offline and online WLAN charging. Common charging functions are illustrated in FIG. 9 with interfaces to both an online charging system and an offline charging system. There may be an interface between the WLAN system and both offline/online charging system. These interfaces may be used to generate charging events for both online and offline cases.

When a WTRU is handed over to the WLAN system, the WLAN system may generate a charging event towards the charging system. The charging event may also be generated by the source eNB/RAN node informing the charging system that the WTRU has been handed over to WLAN. Both charging events may be used for reconciliation purposes. Similar events may be generated when the WTRU moves back to the 3GPP system from the WLAN system.

A charging event may also be generated when the WTRU moves between different WLAN APs. There may be certain exceptions to this, e.g., if the WTRU moves between WLANs controlled by the same operator, a charging event may not be generated.

The charging record sent to the charging system by the WLAN APs may contain one or more of the following information: duration of the WLAN usage; amount of data; data rate; quality of service (QoS); WLAN operator PLMN ID or other identification; SSID or BSSID; and/or user identification, e.g., MAC address, IMSI, T-IMSI, etc.

The processes and instrumentalities described herein may apply in any combination, may apply to other wireless technologies, and for other services.

A WTRU may refer to an identity of the physical device, or to the user's identity such as subscription related identities, e.g., MSISDN, SIP URI, etc. WTRU may refer to application-based identities, e.g., user names that may be used per application.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method for determining, at a wireless transmit/receive unit (WTRU), whether to steer traffic to or from a wireless local area network (WLAN) network, the method comprising:

the WTRU
determining a WLAN offload condition based on one or more measurements associated with a serving cell;
generating, at a layer of a WTRU access stratum, an indication based on the one or more measurements, wherein the indication is associated with a first value when an entering condition is triggered and is associated with a second value when a leaving condition is triggered, wherein the first value indicates steering traffic to the WLAN and the second value indicates steering traffic from the WLAN;
determining a wireless local area network (WLAN) associated with the indication;
sending, from the layer of the WTRU access stratum, the indication associated with the first value or the second value to a higher layer, wherein the higher layer is above the layer of the WTRU access stratum; and upon receiving, from the layer of the WTRU access stratum, the indication associated with the first value at the higher layer, evaluating, at the higher layer, whether to steer traffic to the WLAN based on the indication and the WLAN associated with the indication; and on a condition that the evaluation results in a decision to offload, steering traffic to the WLAN associated with the indication.

2. The method of claim 1, further comprising:
the WTRU receiving a configuration threshold from a radio access network, the configuration threshold comprising an implicit indication to the WTRU of a radio access network preference for the WTRU to steer traffic to or from the WLAN; and
evaluating the configuration threshold at least by evaluating a condition of traffic steering to or from the WLAN.

3. The method of claim 2, further comprising evaluating the WLAN offload condition based on at least one of a higher layer policy or a radio access stratum rule.

4. The method of claim 2, further comprising, in response to evaluating the configuration threshold, forwarding at least one of the configuration threshold or the indication from the layer of the WTRU access stratum to the higher layer.

5. The method of claim 4, wherein the higher layer comprises an access network discovery and selection function (ANDSF) policy engine.

6. The method of claim 2, further comprising, in response to forwarding the at least one of the configuration threshold or the indication from the layer of the WTRU access stratum to the higher layer, causing an access network discovery and selection function (ANDSF) policy to be bypassed.

7. The method of claim 2, further comprising, in response to at least one of evaluating the configuration threshold or sending the indication from the layer of the WTRU access stratum to the higher layer, bypassing an access network discovery and selection function (ANDSF) policy engine.

8. The method of claim 4, further comprising, in response to forwarding the at least one of the configuration threshold or the indication from the layer of the WTRU access stratum to the higher layer, causing an access network discovery and selection function (ANDSF) policy to determine a traffic class that is eligible for traffic steering to or from the WLAN.

9. The method of claim 4, further comprising, in response to forwarding the at least one of the configuration threshold or the indication from the layer of the WTRU access stratum to the higher layer, causing an access network discovery and selection function (ANDSF) policy to determine whether traffic steering to or from the WLAN is prohibited.

10. The method of claim 2, further comprising, in response to at least one of evaluating the configuration threshold or sending the indication from the layer of the WTRU access stratum to the higher layer, causing an access network discovery and selection function (ANDSF) policy engine to determine whether an access point is suitable for offloading.

11. The method of claim 1, further comprising the WTRU receiving a measurement scaling parameter.

12. The method of claim 11, further comprising adjusting a frequency of performing a WLAN measurement as a function of the measurement scaling parameter, the measurement scaling parameter comprising at least one of an S-measure value, a hysteresis value, an offload offset value, or an offload threshold value.

13. A wireless transmit/receive unit (WTRU) comprising:
a wireless local area network (WLAN) component;
a processor; and
a memory in communication with the processor and storing instructions that, when executed by the processor, cause the WTRU to:
determine a WLAN offload condition based on one or more measurements associated with a serving cell;
generate, at a layer of a WTRU access stratum, an indication based on the one or more measurements, wherein the indication is associated with a first value when an entering condition is triggered and is associated with a second value when a leaving condition is triggered, wherein the first value indicates steering traffic to the WLAN and the second value indicates steering traffic from the WLAN;
determine a wireless local area network (WLAN) associated with the indication;
send, from the layer of the WTRU access stratum, the indication associated with the first value or the second value to a higher layer, wherein the higher layer is above the layer of the WTRU access stratum;
upon receiving, from the layer of the WTRU access stratum, the indication associated with the first value at the higher layer from the layer of the WTRU access stratum,
evaluate, at the higher layer, whether to steer traffic to the WLAN based on the indication and the WLAN associated with the indication; and
on a condition that the evaluation results in a decision to offload, steer traffic to the WLAN associated with the indication.

14. The WTRU of claim 13, wherein the processor is configured to cause the WTRU to evaluate capability of the WTRU based on the indication associated with the first value.

15. The WTRU of claim 13, wherein the WTRU access stratum comprises a physical layer.

16. The method of claim 1, the method further comprising causing the WTRU to evaluate capability of the WTRU based on the indication of associated with the first value.

17. The method of claim 1, wherein the WTRU access stratum comprises a physical layer.

18. The method of claim 1, wherein the evaluation is further based on access network discovery and selection function (ANDSF) rules.

19. The WTRU of claim 13, wherein the evaluation is further based on access network discovery and selection function (ANDSF) rules.

* * * * *

UNITED STATES PATENT AND TRADEMARK OFFICE
CERTIFICATE OF CORRECTION

PATENT NO. : 10,085,193 B2
APPLICATION NO. : 14/782004
DATED : September 25, 2018
INVENTOR(S) : Baghel et al.

Page 1 of 1

It is certified that error appears in the above-identified patent and that said Letters Patent is hereby corrected as shown below:

In the Claims

Column 28, Line 51: delete "of"

Signed and Sealed this
Ninth Day of April, 2019

Andrei Iancu
*Director of the United States Patent and Trademark Office*